(12) United States Patent
Al-Kofahi et al.

(10) Patent No.: US 9,858,469 B2
(45) Date of Patent: Jan. 2, 2018

(54) MODULAR IMAGE ANALYSIS SYSTEM AND METHOD

(71) Applicant: GE Healthcare Bio-Sciences Corp., Marlborough, MA (US)

(72) Inventors: Yousef Al-Kofahi, Niskayuna, NY (US); Brion Daryl Sarachan, Niskayuna, NY (US)

(73) Assignee: GE Healthcare Bio-Sciences Corp., Marlborough, MA (US)

( * ) Notice: Subject to any disclaimer, the term of this patent is extended or adjusted under 35 U.S.C. 154(b) by 0 days.

(21) Appl. No.: 15/104,492

(22) PCT Filed: Dec. 18, 2014

(86) PCT No.: PCT/US2014/071087
§ 371 (c)(1),
(2) Date: Jun. 14, 2016

(87) PCT Pub. No.: WO2015/102919
PCT Pub. Date: Jul. 9, 2015

(65) Prior Publication Data
US 2016/0314335 A1    Oct. 27, 2016

Related U.S. Application Data

(60) Provisional application No. 61/921,690, filed on Dec. 30, 2013.

(51) Int. Cl.
*G06K 9/00* (2006.01)
*G06K 9/46* (2006.01)
(Continued)

(52) U.S. Cl.
CPC ......... *G06K 9/0014* (2013.01); *G06K 9/4671* (2013.01); *G06K 9/52* (2013.01);
(Continued)

(58) Field of Classification Search
CPC ............... G06K 9/0014; G06K 9/4671; G06K 2009/4666; G06K 9/52; G06T 7/0081;
(Continued)

(56) References Cited

U.S. PATENT DOCUMENTS

| | | | |
|---|---|---|---|
| 6,215,892 B1 | 4/2001 | Douglass et al. | |
| 2009/0245598 A1* | 10/2009 | Can | G06T 7/0012 382/128 |
| 2010/0290692 A1* | 11/2010 | Macaulay | G06T 7/0012 382/133 |

FOREIGN PATENT DOCUMENTS

WO    2010/125495 A2    11/2010

OTHER PUBLICATIONS

Rangan et al., "Quantification of renal pathology by image analysis (Methods in Renal Research)", Nephrology, vol. 12, No. 6., 2007, pp. 553-558.
(Continued)

*Primary Examiner* — Ruiping Li
(74) *Attorney, Agent, or Firm* — Eversheds Sutherland (US) LLP

(57) ABSTRACT

The present disclosure relates to characterization of biological samples via modular image analysis. By way of example, the analysis may include extracting plurality of regions of interest from the biological sample from a plurality of image data sets. Each region of interest may include a combination of one or more subsets of an image data set. In one example, an image data set may be generated by image segmentation. After each region of interest is extracted, at least one metric of the region of interest may be determined.

40 Claims, 19 Drawing Sheets

(51) Int. Cl.
  *G06K 9/52* (2006.01)
  *G06T 7/40* (2017.01)
  *G06T 7/11* (2017.01)
  *G06T 7/174* (2017.01)
  *G06T 7/187* (2017.01)

(52) U.S. Cl.
  CPC ............... *G06T 7/11* (2017.01); *G06T 7/174* (2017.01); *G06T 7/187* (2017.01); *G06T 7/40* (2013.01); *G06K 2009/4666* (2013.01); *G06T 2207/10056* (2013.01); *G06T 2207/20112* (2013.01); *G06T 2207/30004* (2013.01); *G06T 2207/30024* (2013.01)

(58) Field of Classification Search
  CPC . G06T 7/40; G06T 7/0097; G06T 7/11; G06T 2207/10056; G06T 2207/20112; G06T 2207/30004
  See application file for complete search history.

(56) References Cited

OTHER PUBLICATIONS

International Search Report and Written Opinion regarding International Application PCT/US2014/071087, dated Nov. 24, 2015, 16 pages.

\* cited by examiner

| Feature | Image in (C) | Image in (D) | %Difference |
|---|---|---|---|
| Median intensity | 4040 | 4011 | 0.7 |
| Mean intensity | 4113 | 4595 | 10.5 |
| Inverse diff moment | 0.118 | 0.381 | 50.7 |
| Inertia | 58.724 | 14.474 | 75.4 |
| Cluster shade | 10652.7 | 5156.21 | 51.6 |
| Cluster prominence | 1.919e+006 | 3.622e+005 | 81.1 |
| Haralick correlation | 9.89836e+006 | 2.9252e+006 | 70.4 |
| High grey level run emphasis | 261.944 | 131.265 | 49.9 |

FIG. 15E

| | | | | | | | | |
|---|---|---|---|---|---|---|---|---|
| CEACAM | %Pos_Epi | Intensity_Pos_Epi | %StrPos_Epi | Intensity_str_Pos_Epi | %Pos_Cyt | Intensity_Pos_Cyt | %StrPos_Cyt | |
| | Range_Int | Range_Loc | Contrast_Int | Correlation_int | Energy_Int | Homogeneity_Int | Stdv_Int1 | |
| MUC1 | %Pos_Epi | Intensity_Pos_Epi | %StrPos_Epi | Intensity_str_Pos_Epi | %Pos_Cyt | Intensity_Pos_Cyt | %StrPos_Cyt | |
| | Range_Int | Range_Loc | Contrast_Int | Correlation_int | Energy_Int | Homogeneity_Int | Stdv_Int1 | |
| CK5_6 | %Pos_Epi | Intensity_Pos_Epi | %StrPos_Epi | Intensity_str_Pos_Epi | %Pos_Cyt | Intensity_Pos_Cyt | %StrPos_Cyt | A |
| | Range_Int | Range_Loc | Contrast_Int | Correlation_int | Energy_Int | Homogeneity_Int | Stdv_Int1 | |
| TRIM29 | %Pos_Epi | Intensity_Pos_Epi | %StrPos_Epi | Intensity_str_Pos_Epi | %Pos_Cyt | Intensity_Pos_Cyt | %StrPos_Cyt | |
| | Range_Int | Range_Loc | Contrast_Int | Correlation_int | Energy_Int | Homogeneity_Int | Stdv_Int1 | |
| SLC7A5 | %Pos_Epi | Intensity_Pos_Epi | %StrPos_Epi | Intensity_str_Pos_Epi | %Pos_Cyt | Intensity_Pos_Cyt | %StrPos_Cyt | |
| | Range_Int | Range_Loc | Contrast_Int | Correlation_int | Energy_Int | Homogeneity_Int | Stdv_Int1 | |

▨ Intensity and area features ▩ Texture features ▥ Biomarker co-localization features

FIG. 16A

| Intensity_St rPos_Cyt | %Pos_Nuc | Intensity_Pos_Nuc | %StrPos_Nuc | Intensity_StrPos_Nuc | Entropy_Int | Entropy_Loc |
|---|---|---|---|---|---|---|
| Stdv_loc1 | Stdv_Int2 | Stdv_loc2 | CEACAM_MUC1_Col | CEACAM_SLC7A5_Col | CEACAM_TRIM29_Col | CEACAM_CK5_6_Col |
| Intensity_St rPos_Cyt | %Pos_Nuc | Intensity_Pos_Nuc | %StrPos_Nuc | Intensity_StrPos_Nuc | Entropy_Int | Entropy_Loc |
| Stdv_loc1 | Stdv_Int2 | Stdv_loc2 | CK5_6_CEACAM_Col | CK5_6_MUC1_Col | CK5_6_TRIM29_Col | CK5_6_SLC7A5 |
| Intensity_St rPos_Cyt | %Pos_Nuc | Intensity_Pos_Nuc | %StrPos_Nuc | Intensity_StrPos_Nuc | Entropy_Int | Entropy_Loc |
| Stdv_loc1 | Stdv_Int2 | Stdv_loc2 | MUC1_CEACAM_Col | MUC1_slc7A5_Col | MUC1_TRIM29_Col | MUC1_CK5_6_Col |
| Intensity_St rPos_Cyt | %Pos_Nuc | Intensity_Pos_Nuc | %StrPos_Nuc | Intensity_StrPos_Nuc | Entropy_Int | Entropy_Loc |
| Stdv_loc1 | Stdv_Int2 | Stdv_loc2 | SLC7A5_CEACAM_Col | SLC7A5_MUC1_Col | SLC7A5_TRIM29_Col | SLC7A5_CK5_6_Col |
| Intensity_St rPos_Cyt | %Pos_Nuc | Intensity_Pos_Nuc | %StrPos_Nuc | Intensity_StrPos_Nuc | Entropy_Int | Entropy_Loc |
| Stdv_loc1 | Stdv_Int2 | Stdv_loc2 | TRIM29_CEACAM_Col | TRIM29_mUC1_Col | TRIM29_SLC7A5_Col | TRIM29_CK5_6_Col |

▨ Intensity and area features   ▨ Texture features   ▨ Biomarker co-localization features

FIG. 17

| CEACAM | Manual | |
|---|---|---|
| Train | +ve | -ve |
| Auto +ve | 22 | 0 |
| Auto -ve | 0 | 3 |

Accuracy on train = 100%

| | Manual | |
|---|---|---|
| Train | +ve | -ve |
| Auto +ve | 42 | 3 |
| Auto -ve | 0 | 5 |

Accuracy on test t = 94%

| CK5_6 | Manual | |
|---|---|---|
| Train | +ve | -ve |
| Auto +ve | 22 | 0 |
| Auto -ve | 0 | 3 |

Accuracy on train = 100%

| | Manual | |
|---|---|---|
| Train | +ve | -ve |
| Auto +ve | 30 | 4 |
| Auto -ve | 0 | 16 |

Accuracy on test = 92%

| MUC1 | Manual | |
|---|---|---|
| Train | +ve | -ve |
| Auto +ve | 22 | 1 |
| Auto -ve | 0 | 3 |

Accuracy on train = 98%

| | Manual | |
|---|---|---|
| Train | +ve | -ve |
| Auto +ve | 28 | 4 |
| Auto -ve | 1 | 17 |

Accuracy on test = 90%

| SLC7A5 | Manual | |
|---|---|---|
| Train | +ve | -ve |
| Auto +ve | 8 | 2 |
| Auto -ve | 0 | 15 |

Accuracy on train = 96%

| | Manual | |
|---|---|---|
| Train | +ve | -ve |
| Auto +ve | 28 | 4 |
| Auto -ve | 1 | 17 |

Accuracy on test = 90%

| TRIM29 | Manual | |
|---|---|---|
| Train | +ve | -ve |
| Auto +ve | 22 | 0 |
| Auto -ve | 0 | 3 |

Accuracy on train = 100%

| | Manual | |
|---|---|---|
| Train | +ve | -ve |
| Auto +ve | 26 | 0 |
| Auto -ve | 1 | 23 |

Accuracy on test = 98%

MODULAR IMAGE ANALYSIS SYSTEM AND METHOD

CROSS-REFERENCE TO RELATED APPLICATIONS

This application is a filing under 35 U.S.C. 371 of international application number PCT/US2014/071087, filed Dec. 18, 2014, which claims priority to U.S. application No. 61/921,690, filed Dec. 30, 2013, the entire disclosures of each of which are hereby incorporated by reference.

BACKGROUND

The subject matter disclosed herein relates to image analysis of biological samples. More particularly, the disclosed subject matter relates to a modular region-level image analysis technique that is capable of being configured or modified depending on the sample type or the desired analysis outputs.

Various methods may be used in biology and in medicine to observe different targets in a biological sample. For example, analysis of proteins in histological sections and other cytological preparations may be performed using the techniques of histochemistry, immunohistochemistry (IHC), or immunofluorescence. Such analysis may be performed on acquired images that are stained with probes specific for biomarkers of interest. Once acquired, the images may be analyzed by a variety of techniques In certain analysis techniques, segmentation is used to identify regions and/or units for biomarker quantification and feature extraction (e.g. morphological features). For example, a single cell segmentation analysis involves cell segmentation, cell level quantification and data analysis. The cell segmentation step uses multiple structural markers to segment the different subcellular compartments and then to delineate individual cell borders. This segmentation approach is called whole cell segmentation. In the second step, each biomarker is quantified at the cell level (e.g. mean or total for each cell) and at the subcellular level. Then, these cell level measurements are usually aggregated at the image or subject level at the beginning of the data analysis stage. While whole cell segmentation facilitates performing detailed cell level quantitation, such techniques have some drawbacks. For example, cell segmentation errors may result in quantification errors. In addition, detailed cell segmentation and cell level quantification of an image may be time consuming where the processing time may vary between images depending on tissue characteristics and the number of cells in the image. In addition, manual review of cell segmentation is also time-consuming. Further, cell level quantification does not easily capture tissue level properties (e.g. structural features).

BRIEF DESCRIPTION

In one embodiment, a system for image analysis of a biological sample is provided. The system includes a memory or storage device storing processor-executable instructions that, when executed by a processor, cause acts to be performed comprising: extracting a plurality of regions of interest of the biological sample, wherein each respective region of interest is based on at least one image data set of a plurality of image data sets, and wherein the plurality of image data sets are generated based at least in part on image data representative of one or more probes bound to one or more respective targets in the biological sample; and determining at least one metric for the respective regions of interest, wherein the at least one metric is based on a property of at least one probe of the one or more probes; and a processor configured to execute the instructions stored in the memory or storage device In another embodiment, a system for image analysis of a biological sample is provided that includes a memory or storage device storing processor-executable instructions that, when executed by a processor, cause acts to be performed comprising: receiving image data of a biological sample representative of a respective plurality of probes bound to a respective plurality of targets in the biological sample, wherein the plurality of probes comprises a first probe specific for a biomarker and a second probe specific for a cellular feature; generating a plurality of image data sets comprising a first image data set based on image data representative of the first probe and a second image data set based on image data representative of the second probe; extracting a region of interest of the biological sample based on at least the first image data set and the second image data set, and wherein the region of interest is based at least in part on only a portion of the first image data set and only a portion of the second image data set; and determining a metric of the biomarker in the extracted region of interest based on a property of the first probe in the region of interest; and a processor configured to execute the instructions stored in the memory or storage device.

In another embodiment, a system for image analysis of a biological sample is provided that includes a memory or storage device storing processor-executable instructions that, when executed by a processor, cause acts to be performed comprising: receiving image data of the biological sample representative of a respective plurality of probes bound to a respective plurality of targets in the biological sample, wherein the plurality of probes comprises a first probe specific for a biomarker and a second probe specific for a cellular feature; receiving an input comprising information related to a selection of only a subset of operations to be performed on the image data from a larger set of independent operations stored in the memory, wherein each of the operations in the larger set is configured to generate an image data set from the image data comprising at least two groups; extracting a region of interest from the image data by performing the subset of operations to generate a plurality of respective image data sets associated with respective operations, wherein the region of interest is defined by only a subset of each respective image data set in the plurality of image data sets and wherein the region of interest is extracted from a first subset of a first image data set comprising data representative of the first probe and a second subset of a second image data set comprising data representative of the second probe; and determining a metric of the biomarker in the extracted region of interest and a quantification function based on a property of the first probe; and a processor configured to execute the instructions stored in the memory or storage device.

In another embodiment, a method for image analysis of a biological sample is provided. The method includes receiving image data of the biological sample representative of a respective plurality of probes bound to a respective plurality of targets in the biological sample; receiving a first input comprising information related to a selection of only a first subset of independent operations to be performed on the image data from a larger set of operations stored in the memory, wherein each of the operations in the larger set is configured to generate an image data set from the image data comprising at least two groups; extracting a first region of interest from the image data by performing the first subset of independent operations to generate a first plurality of respective image data sets associated with the respective operations, wherein the first region of interest is based on only a subset of each respective image data set in the first plurality of data sets; and determining a first metric of at least one of the targets in the extracted first region of interest and a quantification function based on a property of at least one probe.

In another embodiment, a system for image analysis of a biological sample is provided that includes a memory or storage device storing processor-executable instructions that, when executed by a processor, cause acts to be performed comprising: extracting a first region of interest of the biological sample based on only a portion of a first image data set, wherein the first image data set is generated based on image data representative of a first probe bound to a first target in the biological sample; determining a first metric based at least in part on a property of the first probe in the region of interest; extracting a second region of interest of the biological sample that is different from the first region of interest; and determining a second metric in the second region of interest; and a processor configured to execute the instructions stored in the memory or storage device.

In another embodiment, a method for image analysis of a biological sample is provided. The method includes generating a first image data set based on image data representative of a biomarker probe and a second image data set based on image data representative of a cellular feature probe, wherein the second image data set is generated by segmenting the image data representative of the cellular feature probe; extracting a region of interest of the biological sample based on at least the first image data set and the second image data set, and wherein the region of interest is based at least in part on only a portion of the first image data set and only a portion of the second image data set; and determining a metric of the biomarker in the extracted region of interest based on a property of the first probe in the region of interest.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 15E is a table showing metrics for the biomarkers in FIG. 15C and FIG. 15D;

FIG. 16 is list of 28 metric showing selected features for each biomarker scoring model; and FIG. 17 shows classification results for biomarkers of FIG. 16.

DETAILED DESCRIPTION

The present disclosure relates to image analysis of microscopy images, for example in molecular pathology applications. In one embodiment of the disclosure, the analysis may include segmenting multi-channel images of a sample to extract different regions of interest and determining one or more metrics for further data analysis. The image analysis techniques disclosed herein may include image segmentation, biomarker quantification, and feature extraction, among other analysis outputs. The disclosed techniques may also be applied to any sample type without assumptions about the tissue type, available biomarkers or segmentation steps. In addition, the techniques may be performed without detailed cell-level analysis and can also be implemented with minimal segmentation. The analysis outputs may include metrics that capture intensity, area, texture and morphological properties of the images. Finally, the disclosed techniques are modular or configurable to permit using any number of regions of interest, enabling/disabling any category of metrics, and adding any number of new categories of metrics.

In particular, the present techniques may be applied independently of the architecture of the tissue (e.g. epithelial vs. stromal) or the available subcellular markers (nuclei, cytoplasm and membrane). The disclosed embodiments may be used in the context of computing metrics for staining quality and antibody validation, to classification and outcome analysis, including survival analysis. In certain embodiments, the implementation of a modular two-level image and region of interest representation facilitates adding/replacing segmentation methods and extracting any number of regions of interest. Additionally, the techniques are modular in that any number of different categories of and combinations of features/metrics may be used, e.g., a subset or all of them. Although any number of segmentation steps can be applied, the disclosed embodiments may be used in conjunction with minimal segmentation where no detailed cell level segmentation is used, which is computationally efficient.

The disclosed embodiments may also facilitate characterizing intensity, area, texture and morphology based features. For example, texture and morphological features may be applicable to study tumor heterogeneity. Additional benefits may also include quantifying the co-localization between any two biomarkers in any given region of interest using absolute intensity and relative positivity levels. The approach computes biomarker-related metrics at multiple scales (multiple resolutions). Therefore, these metrics can describe low level (cell level) and high level (image or tissue level) properties of the biomarker expression levels. Finally, the modular design permits adding any new type of metric to the analysis. For example, the metrics may be customized for a particular desired output, and new metrics may be added as appropriate.

Figure 1:
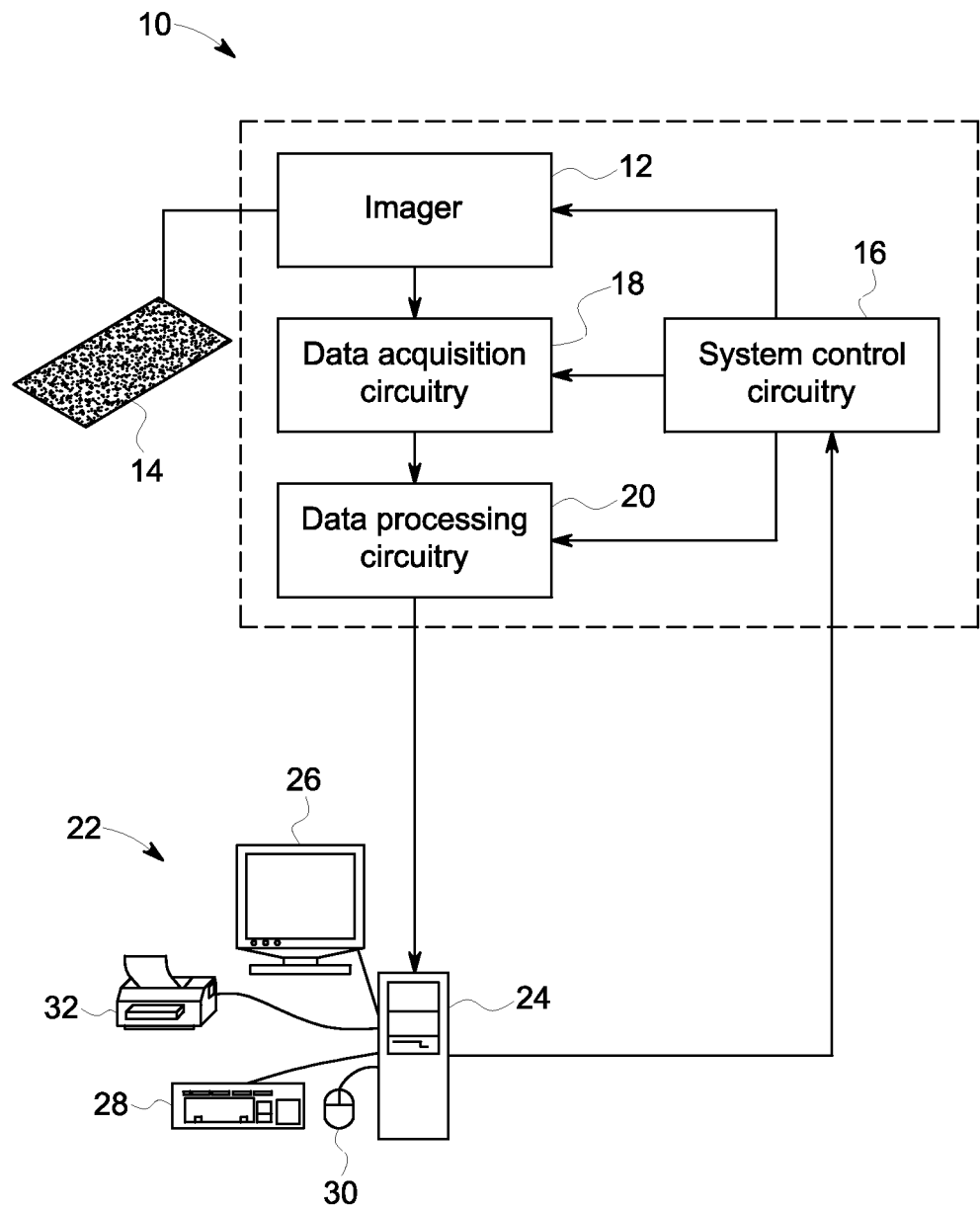
FIG. 1 is a block diagram illustrating an embodiment of a system for assessing a biological sample according to an embodiment of the present disclosure.

The present techniques provide systems and methods for image analysis. In certain embodiments, it is envisioned that the present techniques may be used in conjunction with previously acquired images, for example, digitally stored images, in retrospective studies. In other embodiments, the images may be acquired from a physical sample. In such embodiments, the present techniques may be used in conjunction with an image acquisition system. An exemplary imaging system 10 capable of operating in accordance with the present technique is depicted in FIG. 1. Generally, the imaging system 10 includes an imager 12 that detects signals and converts the signals to data that may be processed by downstream processors. The imager 12 may operate in accordance with various physical principles for creating the image data and may include a fluorescent microscope, a bright field microscope, or devices adapted for suitable imaging modalities. In general, however, the imager 12 creates image data indicative of a biological sample including a population of cells 14, shown here as being multiple samples on a tissue micro array, either in a conventional medium, such as photographic film, or in a digital medium. In certain embodiments, the terms "biological material", "biological sample", "tissue sample", or "sample" may refer to material obtained from, or located in, a biological subject, including biological tissue or fluid obtained from a subject. Such samples can be, but are not limited to, body fluid (e.g., blood, blood plasma, serum, or urine), organs, tissues, biopsies, fractions, and cells isolated from, or located in, any biological system, such as mammals. Biological samples and/or biological materials also may include sections of the biological sample including tissues (e.g., sectional portions of an organ or tissue). Biological samples may also include extracts from a biological sample, for example, an antigen from a biological fluid (e.g., blood or urine). The biological samples may be imaged as part of a slide.

The imager 12 operates under the control of system control circuitry 16. The system control circuitry 16 may include a wide range of circuits, such as illumination source control circuits, timing circuits, circuits for coordinating data acquisition in conjunction with sample movements, circuits for controlling the position of light sources and detectors, and so forth. In the present context, the system control circuitry 16 may also include computer-readable memory elements, such as magnetic, electronic, or optical storage media, for storing programs and routines executed by the system control circuitry 16 or by associated components of the system 10. The stored programs or routines may include programs or routines for performing all or part of the present technique.

Image data acquired by the imager 12 may be processed by the imager 12, for a variety of purposes, for example to convert the acquired data or signal to digital values, and provided to data acquisition circuitry 18. The data acquisition circuitry 18 may perform a wide range of processing functions, such as adjustment of digital dynamic ranges, smoothing or sharpening of data, as well as compiling of data streams and files, where desired.

The data acquisition circuitry 18 may also transfer acquisition image data to data processing circuitry 20, where additional processing and analysis may be performed. Thus, the data processing circuitry 20 may perform substantial analyses of image data, including ordering, sharpening, smoothing, feature recognition, and so forth. In addition, the data processing circuitry 20 may receive data for one or more sample sources, (e.g. multiple wells of a multi-well plate). The processed image data may be stored in short or long term storage devices, such as picture archiving communication systems, which may be located within or remote from the imaging system 10 and/or reconstructed and displayed for an operator, such as at the operator workstation 22.

In addition to displaying the reconstructed image, the operator workstation 22 may control the above-described operations and functions of the imaging system 10, typically via an interface with the system control circuitry 16. The operator workstation 22 may include one or more processor-based components, such as general purpose or application specific computers 24. In addition to the processor-based components, the computer 24 may include various memory and/or storage components including magnetic and optical mass storage devices, internal memory, such as RAM chips. The memory and/or storage components may be used for storing programs and routines for performing the techniques described herein that are executed by the operator workstation 22 or by associated components of the system 10. Alternatively, the programs and routines may be stored on a computer accessible storage and/or memory remote from the operator workstation 22 but accessible by network and/or communication interfaces present on the computer 24. The computer 24 may also comprise various input/output (I/O) interfaces, as well as various network or communication interfaces. The various I/O interfaces may allow communication with user interface devices, such as a display 26, keyboard 28, mouse 30, and printer 32, that may be used for viewing and inputting configuration information and/or for operating the imaging system 10. The various network and communication interfaces may allow connection to both local and wide area intranets and storage networks as well as the Internet. The various I/O and communication interfaces may utilize wires, lines, or suitable wireless interfaces, as appropriate or desired.

More than a single operator workstation 22 may be provided for an imaging system 10. For example, an imaging scanner or station may include an operator workstation 22 which permits regulation of the parameters involved in the image data acquisition procedure, whereas a different operator workstation 22 may be provided for manipulating, enhancing, and viewing results and reconstructed images. Thus, the image processing, segmenting, and/or enhancement techniques described herein may be carried out remotely from the imaging system, as on completely separate and independent workstations that access the image data, either raw, processed or partially processed and perform the steps and functions described herein to improve the image output or to provide additional types of outputs (e.g., raw data, intensity values, cell profiles). It should also be understood that certain image analysis functions may also be performed on a cloud-based system. That is, all or part of the analysis may be cloud-based, and the workstation 22 may be used to provide operator inputs to the cloud to facilitate the analysis, e.g., image selection or target selection, region of interest and/or metric selection.

The modular image analysis algorithms for computing image and region level metrics may be used in a variety of applications in molecular pathology. This is accomplished in conjunction with image analysis algorithms for segmentation, region of interest (ROI) extraction, biomarker thresholding & quantitation and feature extraction. Various metrics may be determined as provided herein and by different data analysis steps depending on the application of interest.

Figure 2:
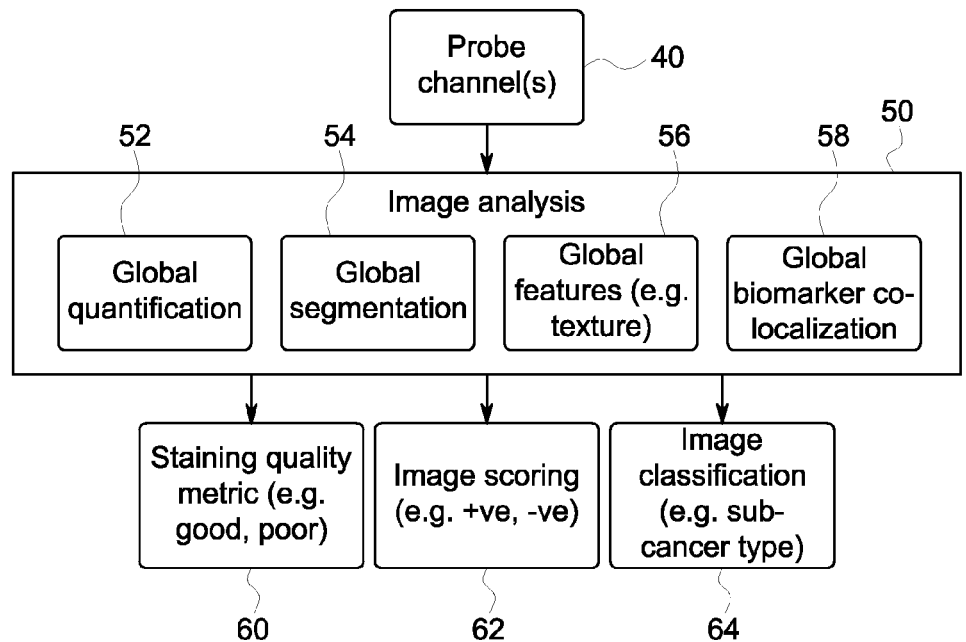
FIG. 2 is a schematic hierarchy of one embodiment of a modular image analysis technique according to an embodiment of the present disclosure.

FIG. 2 is an overview of the modular image analysis technique, which may be applied to various settings. In summary, the image data may be acquired over the biomarker or probe channels 40 and analyzed via the modular image analysis techniques 50 as provided herein. Included in the image analysis 50 may be a two-level modular hierarchy of region of interest extraction and metric determination that facilitates various outputs, including biomarker quantification 52, global segmentation 54, global feature determination (e.g., texture) 56, and information about biomarker co-localization 58. Following such outputs, additional image analysis may be performed, including quality metrics such as staining quality 60, image scoring 62, such as positive or negative, and/or image classification as being a particular cancer type 64.

In general, the set of metrics or global metrics G may be defined as follows:

$$\bar{G}=\{g_1, g_2, \ldots, g_N\} \quad (1)$$

where $g_x$ is a single metric (feature). The number of metrics (N) depends on the application. Each metric $g_x$ is defined using a generic function $\varphi(.)$ as follows:

$$gx=\varphi(ROI_x, I_x, \delta_x) \quad (2)$$

where $ROI_x$, which is the target region of interest, is the region of the image that will be used to compute the metric $g_x$, $I_x$ is the biomarker image for which this metric ($g_x$) is computed and $\delta_x$ is the quantification function, which defines how the metric is computed.

Figure 3:
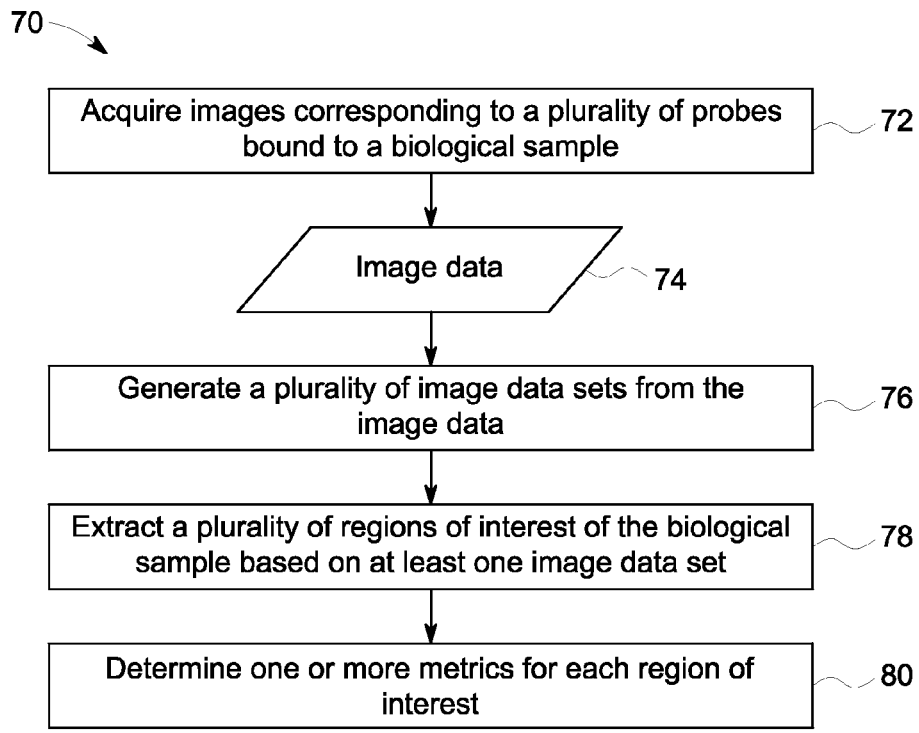
FIG. 3 is a flow diagram of method for modular image analysis according to an embodiment of the present disclosure.

A computer analysis method 70 used to perform the modular image analysis in accordance with the present disclosure is shown in FIG. 3. It should be understood that the method 70 may also be used with stored images that are retrospectively analyzed. Typically, one or more images of the same sample may be obtained or provided. The biological sample is prepared by applying a plurality of probes. At step 72, images maybe acquired by the imaging system 10. The image may be in the form of image data that is representative of the probe bound to the target of interest on the sample. The probes may include probes for identifying cellular features, such as the cell membrane, cytoplasm and nuclei, and probes to one or more biomarkers of interest. Such probes may be considered region extraction probes. In one embodiment, the technique 70 for assessing a biological sample may be performed in conjunction with a multi-molecular, multiplexing imaging technology such as the GE Healthcare MultiOmyx™ platform. In one embodiment, rather than use a separate slide or section to then assess a second probe relative to the first probe, e.g., via image registration techniques on the acquired images, the probe may be inactivated, e.g., via a chemical inactivation, before application of a subsequent second probe. In particular embodiments, the disclosed techniques may be used in conjunction with any number of desired probes, including 2, 3, 4, 5, 6, 7, 8, 9, 10 or more probes per sample. Accordingly, the acquired image data 74 represents a plurality of images or channels, and individual images within the data may be associated with a detected intensity of a particular probe. In one embodiment, the sequential probe imaging may be performed as disclosed in U.S. Pat. No. 7,629,125 to Anup Sood, which is incorporated by reference herein in its entirety for all purposes.

At step 76, the image data 74 is used to generate a plurality of image data sets, as disclosed herein. In one embodiment, an individual image data set may be generated via image segmentation. For example, for a sample including a tumor, the sample may be segmented into epithelial and stromal regions. Image segmentation generally involves the partition of an image into a set of overlapping or nonoverlapping regions whose union is a larger image. As used herein, the term "compartments" may refer to the set of structures identified in an image that share morphological features. Accordingly, the "nuclear compartments" may refer to the set of identified nuclei in an image while the "membrane compartments" refer to the set of identified membrane structures. Further, segmentation may be used to generate image masks that are associated with a particular compartment. The nuclear mask may be defined by the nuclear compartment. For epithelial-stromal segmentation, the epithelial mask may be defined based on epithelial target staining and thresholding. In one embodiment, a mask of the stromal region may be generated, and using curvature and geometry based segmentation, the image of the compartment marker or markers is segmented. For example, the membrane and nuclear regions of a given tumor region may be demarcated. The cytoplasm may be designated as the area between the membrane and nucleus or within the membrane space. Any number and type of morphological markers or cellular feature markers for segmentation may be used. In another embodiment, the image data sets may also be generated by thresholding of biomarker binding. Certain regions or cells may be designated as biomarker positive or biomarker negative. While certain segmentation or other techniques for generating image data sets may generate two different groups in the data set, it should be understood that an image data set may include two or more groups. In one embodiment, the groups may be defined by a thresholding intensity score. For example, an image data set may include a negative binding group, a positive binding group, and a strongly positive binding group. In one embodiment, stromal segmentation may be performed using probabilistic-based methods, such as those provided in U.S. Pat. No. 8,300,938 to Ali Can et al. In another embodiment, epithelium cell segmentation may be performed as the method provided in the US Patent Application entitled "Systems And Methods For Multiplexed Biomarker Quantitation Using Single Cell Segmentation On Sequentially Stained Tissue", Ser. No. 13/865,036 filed Apr. 17, 2013.

Once the image data sets are generated, a plurality of regions of interest may be extracted at step 78 based on only a subset or portion of the data in one or more image data sets. For example, if one image data set includes an epithelial group and a nonepithelial group, the region of interest may be associated with only the epithelial group may exclude the nonselected group from the region of interest. For regions of interest that are defined by or based on a plurality of image data subsets, the region of interest may be the intersection of the various subsets.

After region of interest extraction at step 78, metrics for each region of interest may be determined at step 80. The metrics may be based on one or more biomarker characteristics within the region of interest, and may include intensity metrics, texture metrics, statistical metrics, distribution metrics, etc. Further, when the metrics are based on a particular biomarker, the region of interest may generally include at least a subset of an image data set generated from that biomarker. Accordingly, the biomarkers from which metrics are generated may be considered feature generation biomarkers. For example, the region of interest may include biomarker positive regions within the image that intersect with the other defined parameters of the region of interest. The method 70 may also provide an output related to metrics and/or the extracted regions of interest. The output may include one or more of a histogram, boxplot, density plot, violin plots, or numerical values corresponding to such plots.

Certain techniques may employ a three-level analysis technique that starts from a parent node that represents the image, then a second level of nodes representing high-level segmentation of the image (e.g. epithelial vs. stromal), followed by a number of lower levels depending on the application of interest. The tree usually ends at the lowest level of leaf nodes representing sub-cellular compartments. Such a top-down hierarchical representation relies on assumptions on the tissue architecture and the available structural markers, and therefore, reduces the generality of the algorithm. For instance, a three-level hierarchy may not generalize well in the absence of one segmentation marker.

Figure 4:
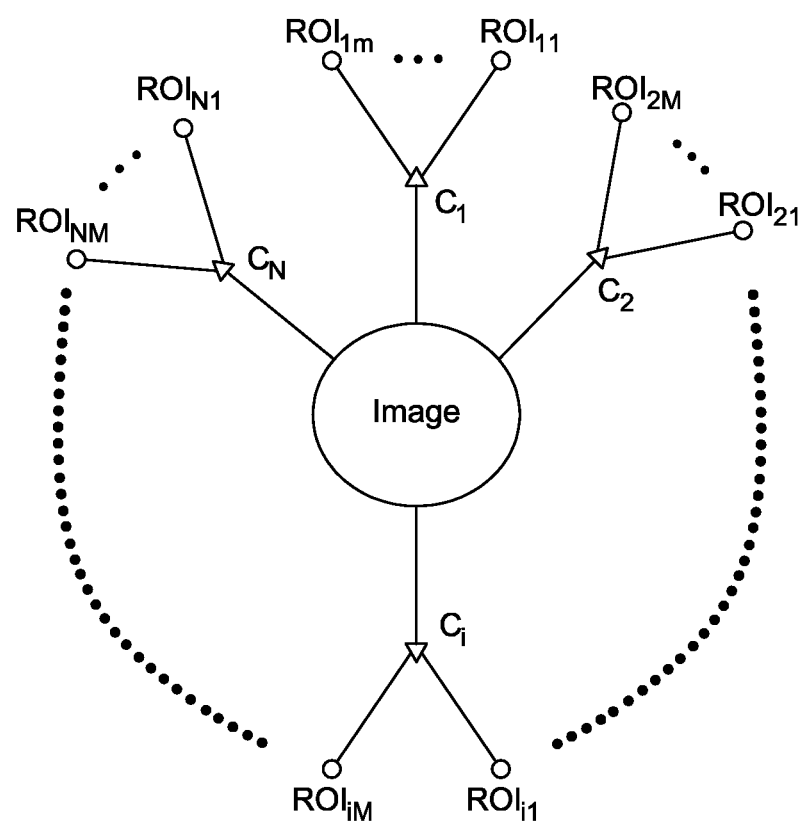
FIG. 4 is shows a two-level representation of image analysis according to an embodiment of the present disclosure.

The present techniques may be used in conjunction with a two-level analysis technique that is illustrated in FIG. 4. The first level (Level_0) represents the whole image as one region of interest (ROI). At the second level (Level_1), N criteria (segmentation methods) can be used to divide the image into non-overlapping regions of interest (ROIs). In this representation, the parent node represents the full image. Then, any number of branches can be created using different criteria/segmentation methods ($C_i$) to divide the image (IM) into different regions of interest $ROI_{ij}$, which are represented as leaf nodes (second level nodes). This can be formulated as follows:

$$C_i: IM \rightarrow \{ROI_{i1}, ROI_{i2}, \ldots, ROI_{iM}\} \quad (3)$$

One advantage of this representation is that it facilitates modular and easily extensible data structures that define the different regions of interest in the image where replacing or adding any number of biomarkers (or structural markers) can be easily done by replacing or adding more second level branches using different criteria/segmentation methods ($C_i$).

Using the 2-level representation explained above, any individual region of interest ROI used to compute a metric gx can be represented as one or a combination of any number of leaf nodes ($ROI_{ij}$). Borrowing from the notation of set operations and assuming that each region $ROI_i$ is represented by a set $S_k$, define $\hat{S}$ as the collection of sets $S_k$ needed to create the target region of interest as follows:

$$\hat{S} = \{S_1, S_2, \ldots, S_N\} \quad (4)$$

Figure 5:
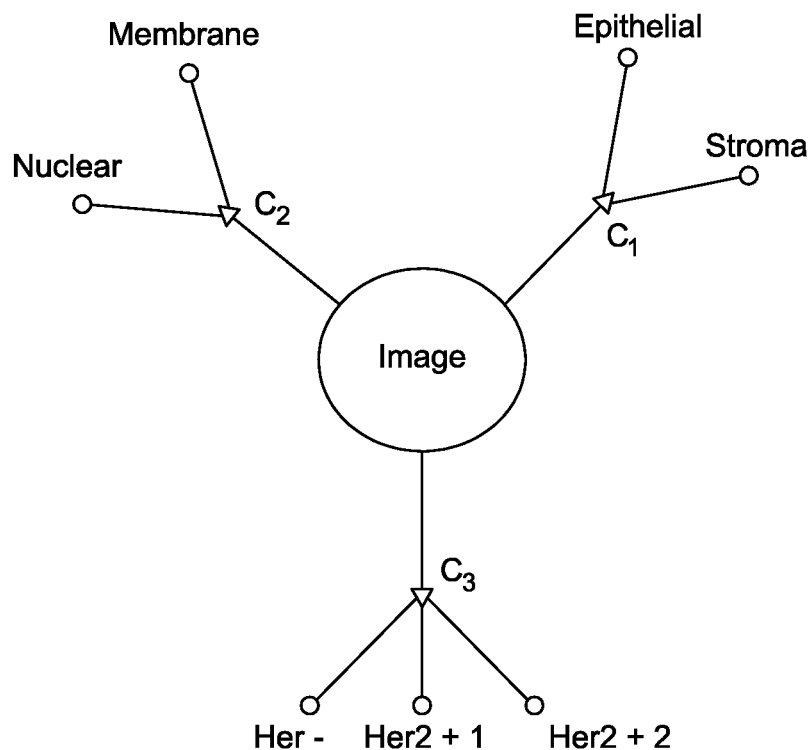
FIG. 5 is an example of a two-level representation according to FIG. 4 of epithelial vs. stromal, nuclear vs. membrane, and Her2− vs. Her2+1 and Her2+2 data.

Then, the target region of interest ($ROI_x$) can be defined as the set resulted from a compound set operations on $\hat{S}$. This can be written as follows:

$$ROI_x = \left( \bigcup_{S_k \in \hat{S}} \bigcap \right) S_k$$

Where $$\left( \bigcup_{S_k \in \hat{S}} \bigcap \right)$$

represents a sequence of arbitrary set operations (i.e. union and/or intersection) on $\hat{S}$. An example is shown in FIG. 5, which illustrates a target region of interest defined as the Her2 positive (+1 or +2) pixels of the membrane of the epithelial cells. In order to extract $ROI_x$, the collection of sets $\hat{S} = \{S_{epithelial}, S_{membrane}, S_{her2+1}, S_{her2+2}\}$ is defined. Then, ROI is defined as follows:

$$ROI_x = S_{epithelial} \cap S_{membrane} \cup (S_{her2+1} \cap S_{her2+2}) \quad (5)$$

As in Equation 2, each metric is computed on a region of interest ($ROI_x$) using a quantification rule $\delta_x$, which is a mathematical function that quantifies a property of the biomarker signal. For example, the quantification rule can be a function that computes the texture patterns or morphological properties of the biomarker, or it can be an average intensity of the biomarker within $ROI_x$. Mathematically, this is:

$$\delta_x = \frac{1}{M} \sum_{p \in ROI_x} I(p)$$

where M is the number of pixels in $ROI_x$, and I is the image (e.g. biomarker image) on which the metric is computed. Using the modular analysis technique as provided herein, the quantification rule is independent from the extracted regions of interests and their number. The number of regions of interest and the number of quantification rules are the two factors that determine the number of metrics for each biomarker and their categories. For example, in certain embodiments, for each region of interest that is extracted, one or more metrics may be determined.

In certain embodiments, the modular image analysis techniques may be applied to any type of biological sample. In contrast to workflows in which the available segmentation or other analysis is highly dependent on the tissue type, the present techniques facilitate modular selection of analysis algorithms, including segmentation and metric quantitation algorithms, from a set of stored algorithms and that are appropriate for the sample at hand. In one embodiment, an operator may provide an input to the system 10 indicating the tissue type, the probes or biomarkers selected, and the desired analysis (e.g., tumor classification). From such inputs, the system 10 may select from predetermined workflows associated with the tissue and/or the desired outputs. For example, if the tissue is indicated as being a muscle tissue, the system 10 may provide a menu or prompts listing segmentation markers associated with muscle tissue or cell features. Such prompts or menu items may also be determined based on an input relating to the probes used for analysis. For example, if DAPI image information is available, the system 10 may provide prompts to select for extraction of the nuclear compartment or may permit nuclear region of interest selection only upon receipt of DAPI or other nuclear marker image data.

Alternatively, an operator may define a desired workflow by providing inputs defining one or more regions of interest and desired metrics to be calculated. Such information may also be provided to an operator prior to image acquisition to ensure that the appropriate probes are applied to the sample to facilitate the desired analysis. Regardless of how the workflow is defined (e.g., from stored workflows, from operator input, or a combination thereof), each workflow may only employ a subset of the available (i.e., stored) extraction algorithms for particular regions of interest and for a particular biological sample analysis. For example, certain workflows may not involve epithelial-stromal segmentation, while other workflows may not involve membrane or cytoplasm segmentation. Further, an operator or workflow may employ only a subset of the available metrics quantitation functions for a particular analysis.

In one implementation, the modular image analysis technique may be used to validate the specificity of a targeted antibody. In the depicted example, the analysis is to determine if the Oct2 antibody is staining properly. Oct2 is specific for epithelial cells that are positive for CD20. The region of interest ($ROI_1$) used in this example is defined in FIG. 6. The metrics may be defined as having various levels, and one or more metrics from each "level" may be generated, where the various levels may be as follows: Level 0: intensity histograms; Level 1: basic intensity metrics (or descriptive intensity statistics); Level 2: Thresholding-based intensity and percentage area metrics; Level 3: biomarker Co-localization metrics; and Level 4: texture and morphological metrics Here, basic intensity (level 1) metrics are computed to quantify Oct2. The abstract definition of the metrics vector ($\overline{G}_{(Oct2,1)}$) is shown as well, indicating that, for the region of interest ($ROI_1$) of epithelial CD20 positive cells, the image information for Oct2 (i.e., the channel of image data representative of the Oct2 probe) is used to assess an intensity metric for Oct2.

Figure 6:
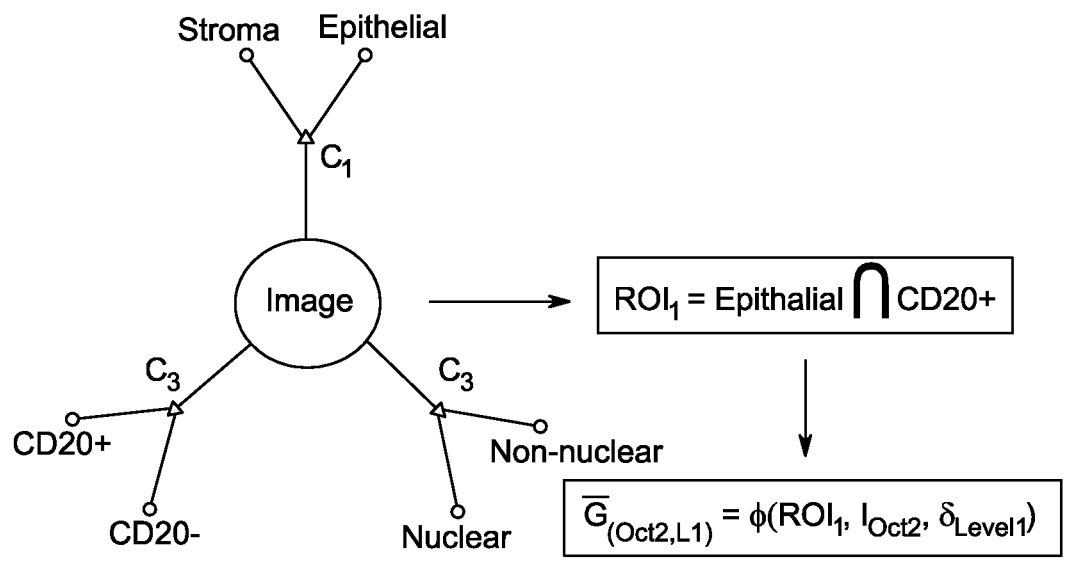
FIG. 6 is a representation of a region of interest and the metrics vector for an antibody validation technique according to an embodiment of the present disclosure.
Figure 7:
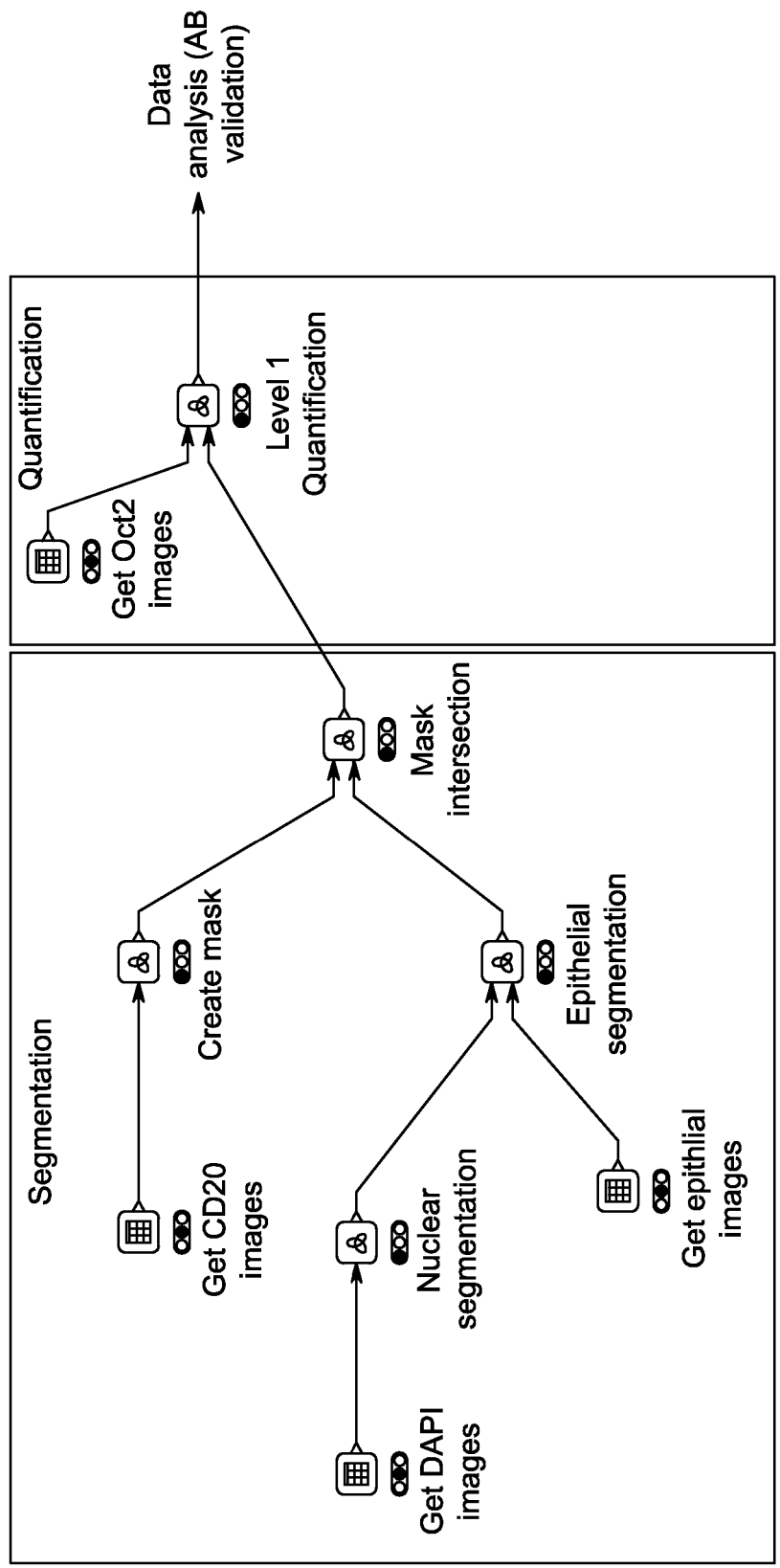
FIG. 7 is the antibody validation workflow for FIG. 6.

The corresponding workflow for FIG. 6 is shown in FIG. 7. From left-to-right, the workflow creates an epithelial mask using as inputs to the epithelial segmentation algorithm an epithelial stained image along with a nuclear mask that was created by applying a nuclear segmentation algorithm to a DAPI image. A CD20 mask is created by applying an algorithm to a CD20-stained image. The mask intersection of the CD20 mask and the epithelial mask results in the mask showing the region of the epithelium that is positive for CD20. At the right of the diagram, an Oct2 image is quantitated relative to the CD20 epithelial mask, to result in a score for Oct2 staining in the CD20 positive epithelial region, which is also an overall score of quality for the Oct2 antibody.

Figure 8:
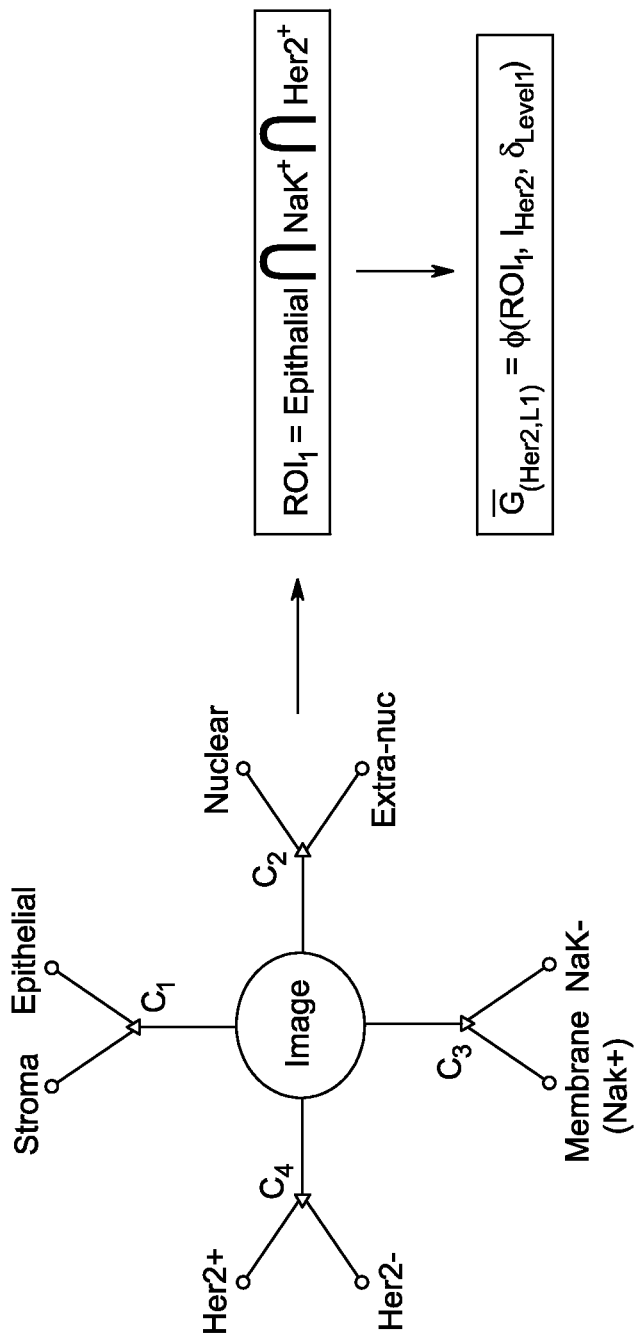
FIG. 8 is a representation of a region of interest and the metrics vector for a Her2 biomarker scoring technique according to an embodiment of the present disclosure.
Figure 9:
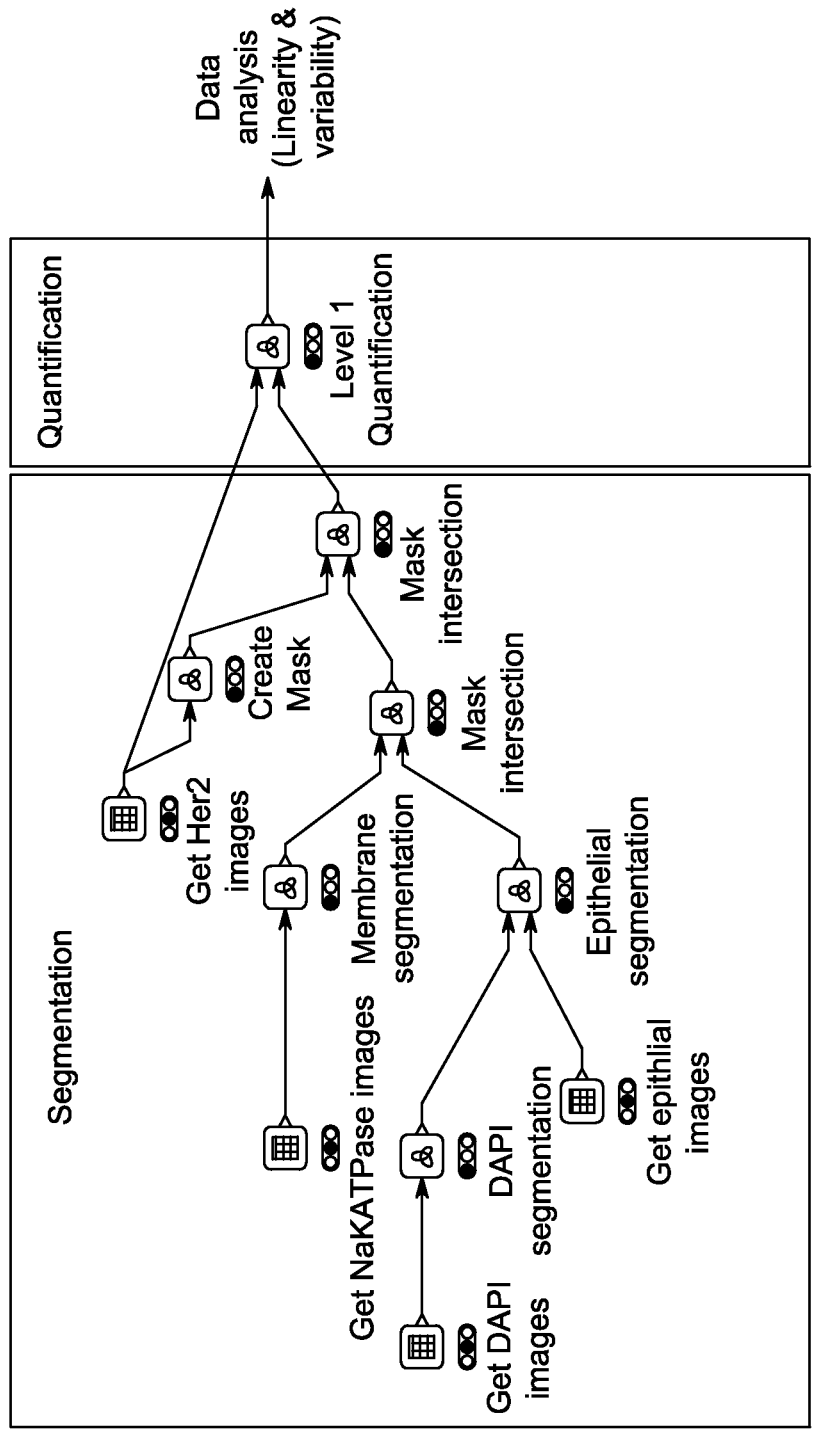
FIG. 9 is the biomarker scoring workflow for FIG. 8.

In another embodiment, shown in FIG. 8, the modular image analysis techniques may be used for studying Her2 linearity and variability. In the depicted example, a mask is created for membrane within the epithelium in a similar technique to creating the CD20 epithelial mask in FIG. 6. This mask is further specialized to the subset of the epithelial membrane that is also positive for Her2. Finally, the Her2 stained images are quantified relative to the epithelial, membrane, Her2-positive mask, which was followed by studying the linearity and variability of Her2 across slides and batches of slides. The region of interest ($ROI_1$) and the intensity metrics vector ($\overline{G}_{(Her2,1)}$) are defined in FIG. 8 and the corresponding workflow is shown in FIG. 9.

Figure 10:
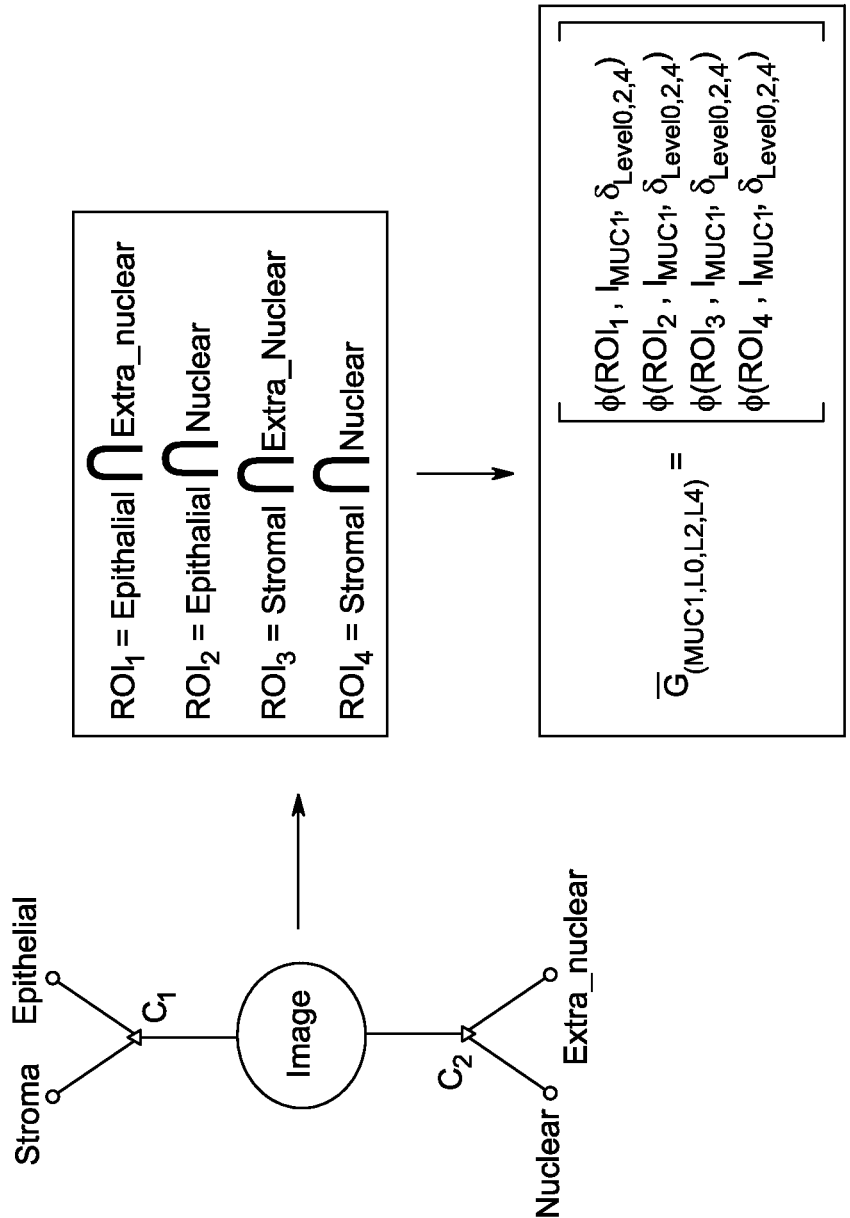
FIG. 10 is a representation of a region of interest and the metrics vector for a MUC1 biomarker scoring technique according to an embodiment of the present disclosure.
Figure 11:
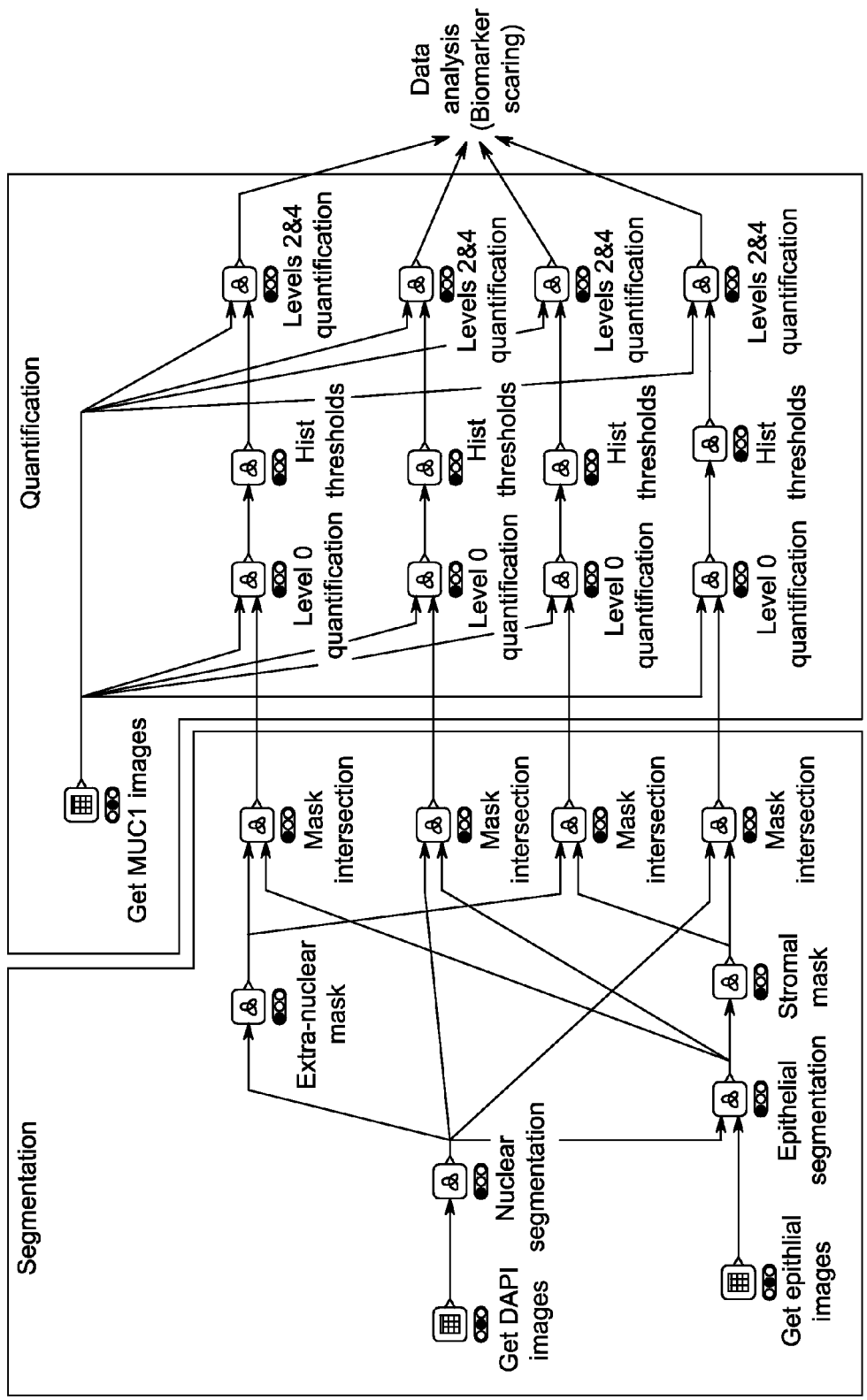
FIG. 11 is the biomarker scoring workflow for FIG. 10.

FIG. 10 shows how a biomarker (MUC1) may be scored using intensity and % Area (level 2) metrics as well as texture metrics computed on four segmentation mask combinations:
$ROI_1$: Epithelial extra-nuclear mask
$ROI_2$: Epithelial nuclear mask
$ROI_3$: Stromal extra-nuclear mask
$ROI_4$: Stromal nuclear mask That is, for a particular biological sample, one or more regions of interest may be analyzed, each with their corresponding metrics according to the desired outputs. The quantification step shows similar workflows replicated four times, for each of the segmentation masks of the regions of interest. In one embodiment, an operator may select one or all of the four inputs, and selecting fewer than four would eliminate the need for some of the replication of the quantification workflow. That is, the epithelial-stromal segmentation of the first region of interest may also be applied to the second, third, and fourth region of interest. The quantification workflow first generates histogram data (level 0 quantification), then calculates thresholds based on those histograms, and then generates threshold-based metrics for intensity, percent area, and texture (level 2 and 4 quantification). The workflow is shown in FIG. 11.

Figure 12:
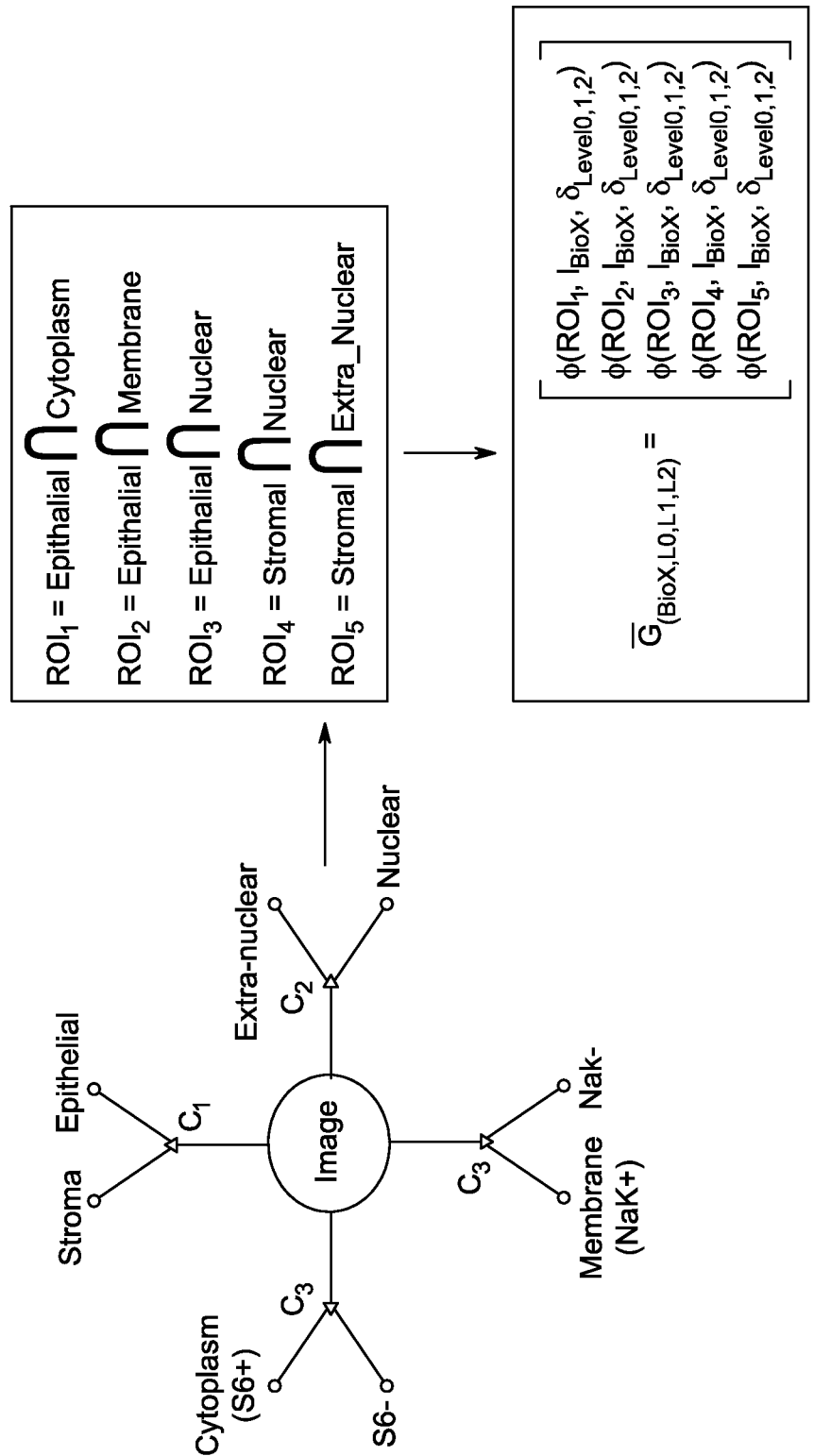
FIG. 12 is a representation of a region of interest and the metrics vector for a biomarker scoring technique with 32 biomarkers for a lung study according to an embodiment of the present disclosure.
Figure 13:
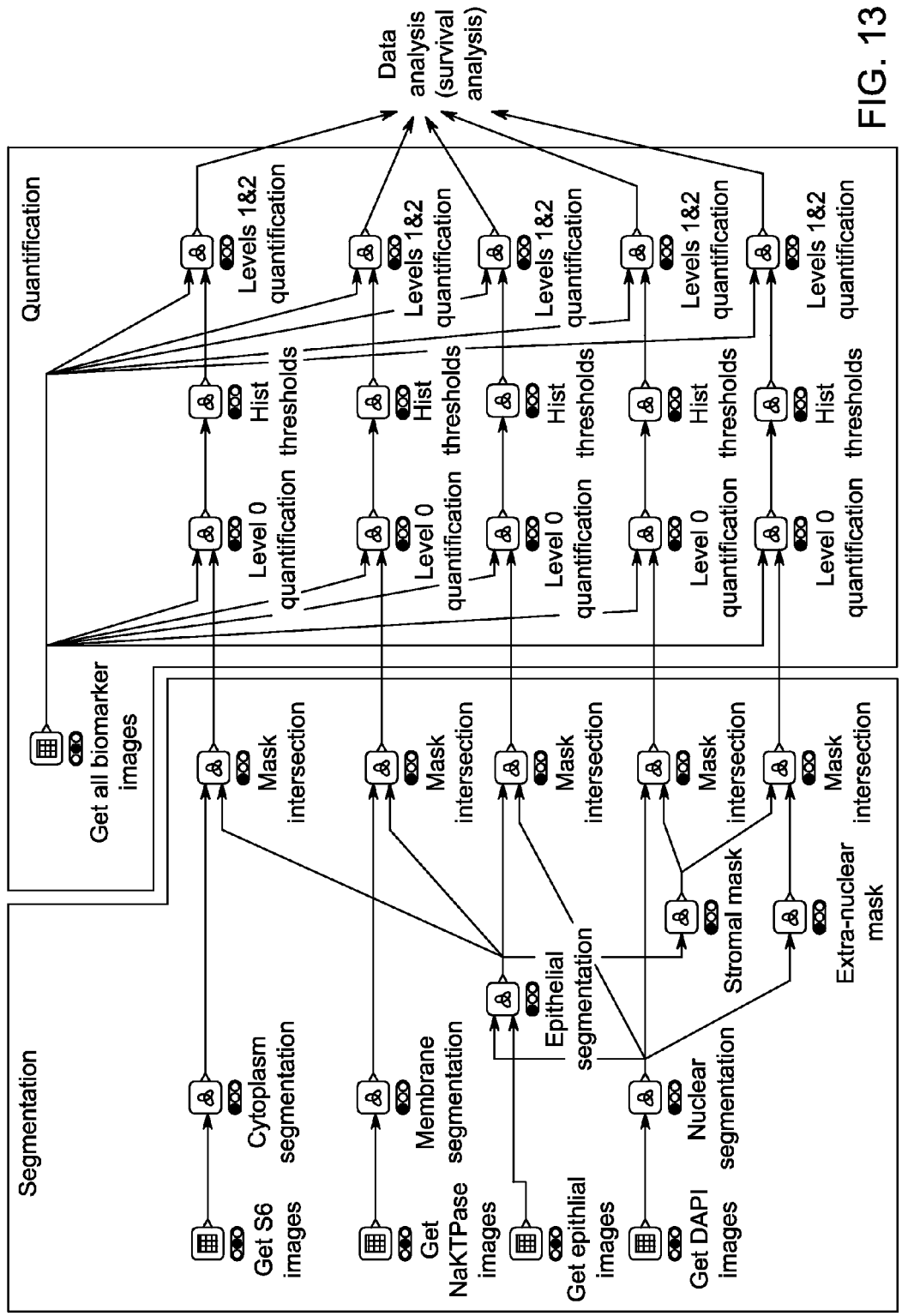
FIG. 13 is the survival analysis workflow for FIG. 12.

FIG. 12 illustrates the application of the modular image analysis approach to perform survival analysis on a lung study in which 32 biomarkers were used. This example creates five mask combinations:
$ROI_1$: Epithelial cytoplasm mask
$ROI_2$: Epithelial membrane mask
$ROI_3$: Epithelial nuclear mask
$ROI_4$: Stromal nuclear mask
$ROI_5$: Stromal extra-nuclear mask The quantitation in this example further generalizes the quantitation relative to FIG. 10 by computing histograms (level 0), intensity and area (Levels 1 & 2) metrics for 32 biomarkers rather than one specific one. Details of the regions of interest and the metric vectors are shown in FIG. 13. Since 32 biomarkers were used, FIG. 13 shows an example of the selected metrics definition for one biomarker (BioX). However, such metrics may be selected for any of the available biomarkers.

As noted herein, in addition to facilitating modular mask creation via region of interest definition, the modular design of the metric quantitation permits defining any number of categories of metrics for a particular sample and/or region of interest. The metrics may include one or more intensity metrics, percentage area metrics, texture metrics, morphological metrics, and co-localization metrics.

Intensity metrics (features), i.e., level 1 metrics, quantify some of the intensity statistics of a given biomarker within any region of interest. The number and types of intensity metrics depends on the application. For instance, in a study of quantified Her2 from tissue and cell line samples to study quantification linearity and variability (batch to batch and slide to slide), five different intensity metrics were selected for each region of interest, which are listed in Table 1 below.

TABLE 1

Intensity metrics used to study Her2 Linearity and Variability

| Metric | Definition |
| --- | --- |
| Mean_Her2 | Mean Her2 intensity in $ROI_x$ |
| Median_Her2 | Median Her2 intensity in $ROI_x$ |
| STDEV_Her2 | Standard deviation of the Her2 intensity |

TABLE 1-continued

Intensity metrics used to study Her2 Linearity and Variability

| Metric | Definition |
|---|---|
| Total_Her2 | in ROI$_x$ Total Her2 intensity in ROI$_x$ |
| 90%_Her2 | The 90th percentile of the Her2 intensity in ROI$_x$ |

In addition, intensity statistics may be computed for different biomarker expression levels with level 2 metrics. Using the default parameters, three positivity levels may be defined: weak, medium and strong. It should be understood that any number of positivity levels may be defined, but, in one example, the default parameters may refer to three positivity levels. Referring to the two-level design illustrated in FIG. 4, the application of the thresholding algorithm may be represented as one branch in the tree, as shown in FIG. 5.

Figure 14A:
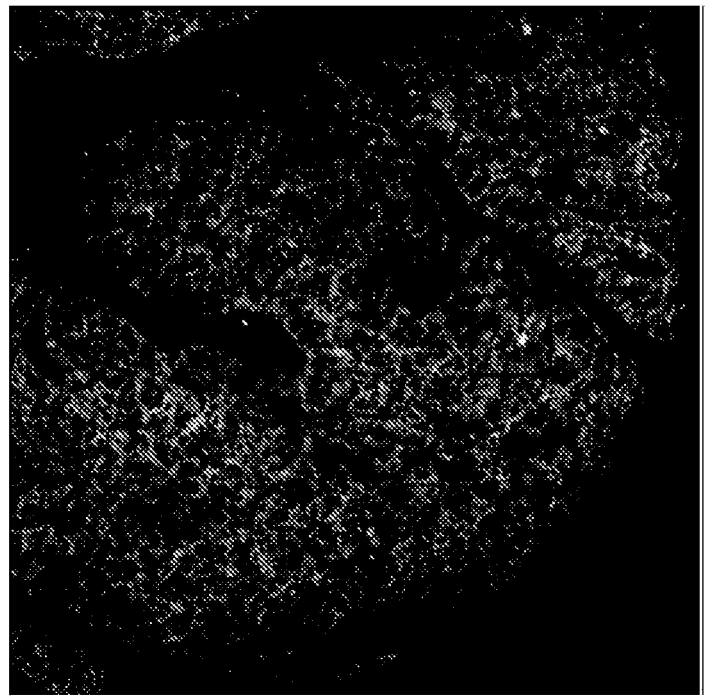
FIG. 14A is an input whole image showing ALDH1 staining.
Figure 14B:
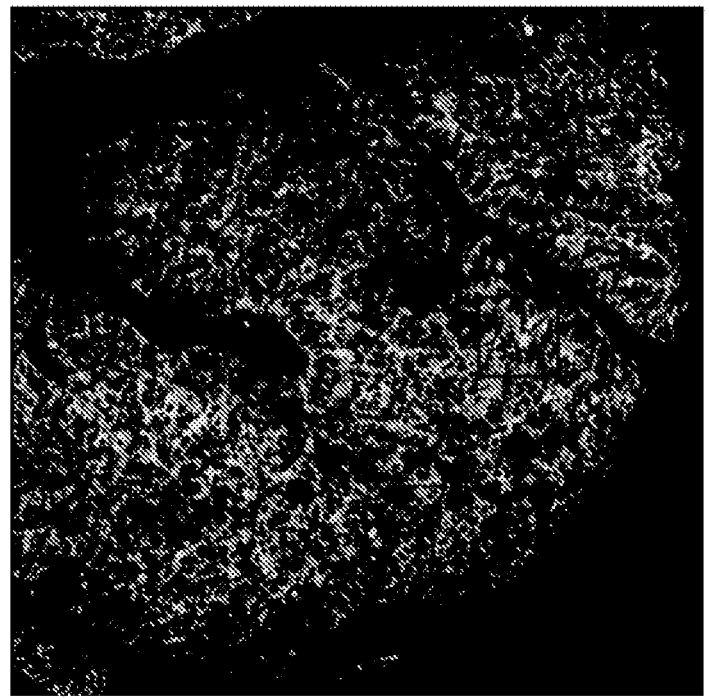
FIG. 14B is the image of 14A showing multi-level thresholding (3 positivity levels of strong, middle, weak, and a negative level)
Figure 14C:
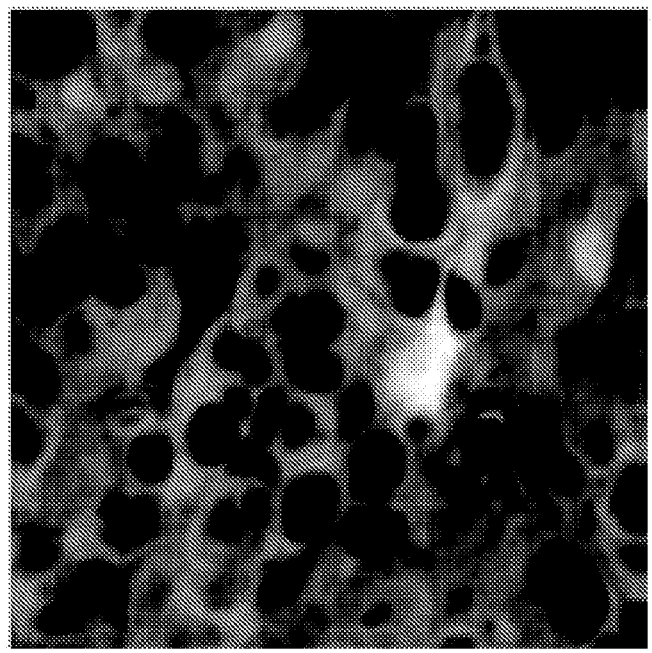
FIG. 14C is a detail view of the highlighted region of FIG. 14A.
Figure 14D:
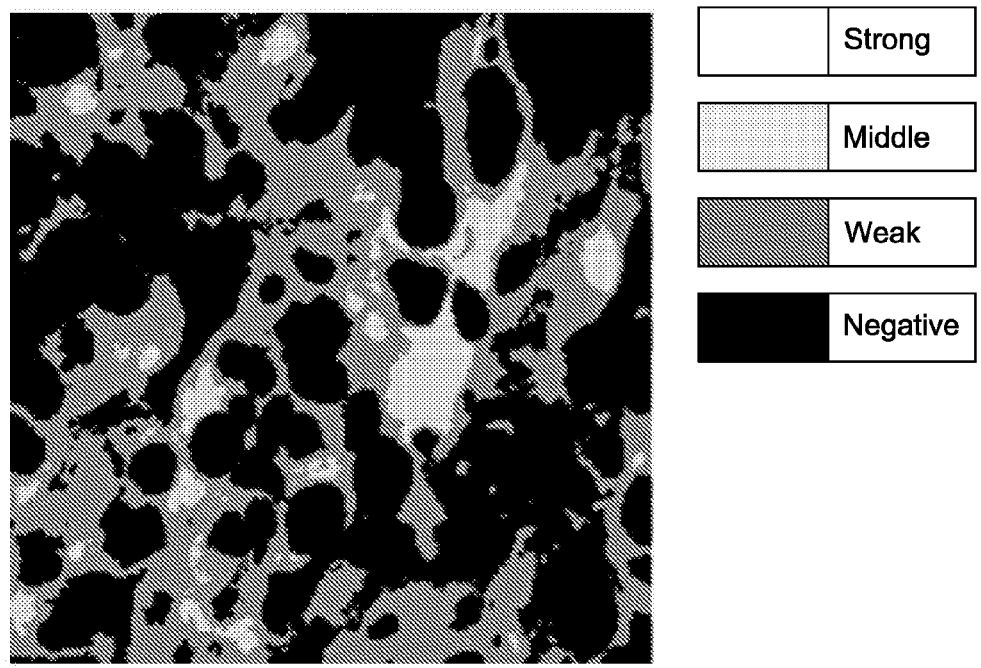
FIG. 14D is a detail view of the highlighted region of FIG. 14B.
Figure 15A:
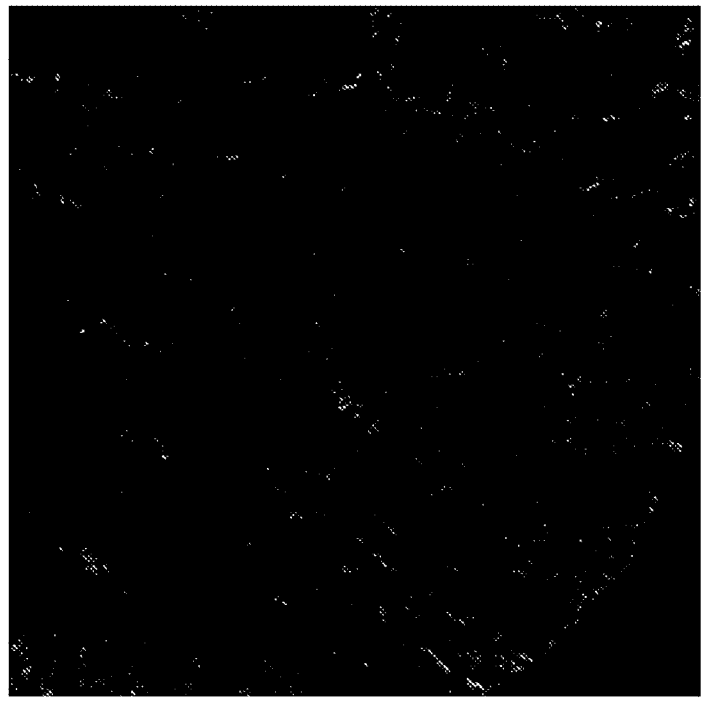
FIG. 15A is a first biomarker image of a sample.
Figure 15B:
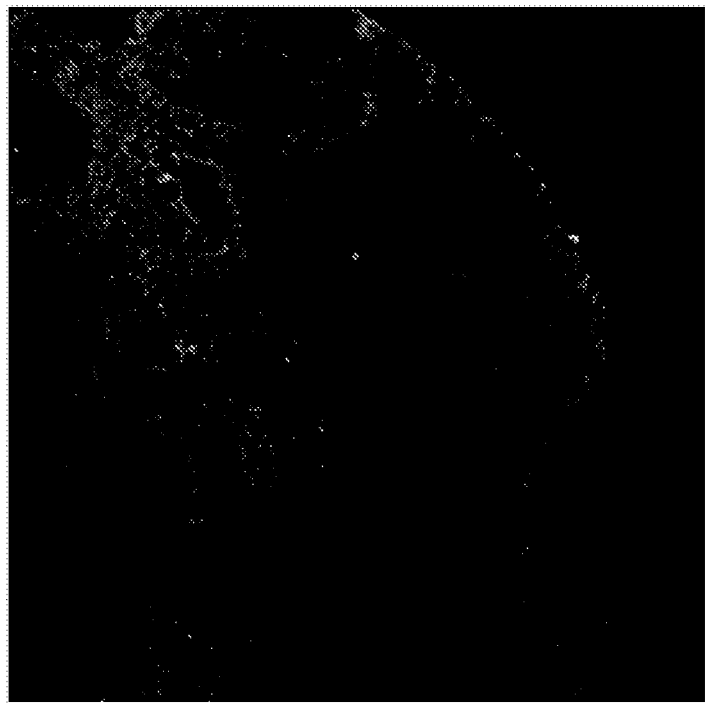
FIG. 15B is a second biomarker image of the sample shown in FIG. 15A.
Figure 15C:
FIG. 15C is a detail view of the highlighted region of FIG. 15A.
Figure 15D:
FIG. 15D is a detail view of the highlighted region of FIG. 15B.

Another example of multi-level thresholding of a biomarker (ALDH1) is shown in FIGS. 14A-14D, which depict an image analyzed using default 3 positivity levels. Furthermore, using the default parameters only one intensity metric (mean intensity) is computed for each positivity level. Therefore, four (4) mean intensities are computed for each region of interest: overall mean and one mean per positivity level within each region of interest. FIG. 14A is the input biomarker ALDH1 image. FIG. 14B is the multi-level thresholding image. FIG. 14C is a detail view of the highlighted box in FIG. 14A. FIG. 14D is a detail view of the highlighted box in FIG. 14B.

Percentage area metrics, e.g., levels 2 metrics, quantify the percentage areas of the different biomarker expression levels within any region of interest. The number of these metrics for a given biomarker depends on the number of regions of interest as well as the number of distinct biomarker expression levels. These metrics may be useful in some scoring applications, such as computing the H-score. Using the default parameters (3 positivity levels), three percentage area metrics are computed for each region of interest. Table 2 below shows the default list of percentage area and intensity metrics using three different regions of interest: whole epithelial cells (Epi), epithelial nuclei only (EpiNuc) and epithelial extra-nuclear regions only (EpiExt). The same features can also be computed for stromal cells.

TABLE 2

Example Intensity & Area Features for the epithelial region using default parameter settings

|  | All | Weak | Medium | Strong |
|---|---|---|---|---|
| Mean |  |  |  |  |
| % Area |  |  |  |  |

Texture metrics quantify spatial variation of pixel intensities in the (e.g. standard deviation & range) as well as advanced ones such as co-occurrence matrix and run-length texture features. In addition, these texture features can be computed at multiple scales. As the scale increases, the size of the window/kernel used to compute local texture increases as well, which allows the capturing of higher-level texture information. One drawback of many of the texture metrics is that they cannot be explained easily by specific intensity patterns in the image. Instead, they can be explained mathematically and using generic properties such as homogeneity, uniformity and randomness of the pixel intensities. Using the default parameters, 20 texture features may be computed for any region of interest for each scale. These features are listed in table 3 below.

TABLE 3

Texture Features at a single scale using default parameter settings

| Texture Feature | Name Description |
|---|---|
| Adaptive STDEV | Standard deviation computed adaptively using a moving window |
| Adaptive Range | Dynamic range computed adaptively using a moving window |
| Energy | A measure of uniformity |
| Entropy | A measure of the randomness of the pixel intensities |
| Correlation | A measure of gray-level linear dependencies between pixels in any region |
| Inverse Difference Moment | A measure of homogeneity/uniformity of the intensities in a region |
| Inertia | A measure of the contrast of the image in a given region |
| Cluster Shade | A measure of symmetry of a given region |
| Cluster | Prominence A measure of symmetry of a given regions |
| Haralick Correlation | A measure of gray-level linear dependencies between pixels in any region |
| Short-Run Emphasis | A measure of the distribution of all short runs (A run is a set of consecutive pixels with the same value) |
| Long-Run Emphasis | A measure of the distribution of all long runs |
| Grey Level Non uniformity | A measure of uniformity/similarity of the pixels in any region |
| Run Length Non uniformity | A measure of uniformity/similarity in in the lengths of the runs in any region |
| Low Grey Level Run Emphasis | A measure of the distribution of low gray-level values |
| High Grey Level Run Emphasis | A measure of the distribution of high-level values |
| Short-Run Low Grey Level Emphasis | A measure of the distribution of short runs of low gray values |
| Short-Run High Grey Level Emphasis | A measure of the distribution of short runs of high gray values |
| Long-Run Low Grey Level Emphasis | A measure of the distribution of long runs of low gray values |
| Long-Run High Grey Level Emphasis | A measure of the distribution of long runs of high gray values |

To better understand the difference between quantifying the spatial distribution of the pixel intensities (texture) and the histogram-based metrics (e.g. mean intensity), FIGS. 15A-15D shows two examples. Two images of a given biomarker (Albumin) are shown in panels 15A and 15B. Close-ups of the regions in the red boxes are shown in panels 15C and 15D respectively. The biomarker signal localization in the sub-cellular compartments (i.e. spatial distribution is different from the two images in panels 15C and 15D.) FIG. 15E shows two histogram statistics.

Morphological metrics capture some properties of the biomarker signal morphology. More specifically, they quantify the degree of fragmentation of the positive biomarker signal at multiple positivity levels within any region of interest such as the number of fragments (connected components) and their average size. In addition to the biomarkers, these metrics can be computed for some of the regions of interests (i.e. masks) defined by some structural markers (e.g. epithelial mask). By default, there are six features computed per biomarker at each level which are listed in Table 4. These metrics can be useful in applications where the morphology of the tissue or the biomarker is important factors that are used to score an image. One example is Her2 grading where the continuity of the staining is an important factor in assigning a grade to the sample.

TABLE 4

Morphological Features for Any Mask Using Default Parameter Settings

| | |
|---|---|
| Total mask area | number of fragments in the mask |
| area of biggest fragment | standard deviation of fragment sizes |
| average area of fragment | Fragments density/scatter within unit area |

Co-localization metrics (features) quantify the degree of spatial co-localization between any two biomarkers. In addition, these co-localization metrics take into account the presence of the biomarkers at multiple expression (positivity) levels and in different sub-cellular compartments. In one embodiment, the image is divided into small equally sized regions (e.g. squares), referred to as unit areas. Then, co-localization metrics are computed locally within each square. Finally, these local metrics are aggregated into ROI (e.g. epithelium) or image level metrics. Two types of co-localization metrics are defined: intensity-based and level-based. In the intensity based metric, given any two biomarkers A and B, the ratio between the two biomarker mean intensities is computed within each unit area $w_i$ as follows:

$$CI_i(A, B) = \frac{\min(U_i^A, U_i^B)}{\max(U_i^A, U_i^B)} \quad (7)$$

where $U_i^A$ and $U_i^B$ are respectively the mean intensities of biomarkers A and B inside $w_i$. Notice that this metric is not normalized if the two biomarkers do not have the same (or similar) slide-level dynamic scale. Therefore, normalization may be performed prior to computing CI. On the other hand, the level based co-localization metric is a normalized metric. It computes the relationships between the numbers of pixels within each expression level (positivity level) for each biomarker. For instance, level j co-localization between biomarkers A and B inside $w_i$ is computed as follows:

$$CL_j^i(A, B) = \frac{\min(T_i^{Aj}, T_i^{Bj})}{\max(T_i^{Aj}, T_i^{Bj})} \quad (8)$$

where $T_i^{Aj}$ and $T_i^{Bj}$ are the total area of level j pixels within $w_i$ for biomarkers A and B respectively.

Scalability and modularity are two advantages of the metrics approach as provided herein, where any number of regions of interest may be extracted from the image and any number of metrics may be computed for each region. Therefore, a very rich (high dimensional) set of metrics can be extracted for each biomarker. For instance, using the default settings, 48 intensity and percentage area metrics can be computed, which include epithelial and stromal regions. In addition, 20 texture metrics can be computed at each scale as well as 6 morphological metrics. This results in more than 70 metrics per biomarker. With minor changes in the settings, this number can be easily doubled. For example, changing the default compartments from nuclear and extra-nuclear to the three subcellular compartments adds 24 metrics. Also, given that a relatively large number of biomarkers can be used (e.g. >30), that may result in a few thousand available metrics per image. Furthermore, multiple biomarker co-localization metrics can be computed between any two biomarkers. Therefore, hundreds of co-localization metrics can be computed. Despite the large number of metrics that can be computed, many of them may be redundant or irrelevant to some applications. For instance, computing multiple positivity level metrics for a binary biomarker or computing stromal metrics for epithelial only markers may be irrelevant or with no added value. However, having a large number of metrics makes this approach applicable to broader set of applications where different subsets of metrics can be selected for different applications. In one modular implementation, an operator or system 10 may enable/disable the different categories of metrics, which permits the user to manually select the subset of the metrics to be computed. In addition, adjusting the algorithm settings can significantly reduce the number of metrics that will be computed. Furthermore, feature selection algorithms can be also used to automatically select the subset of features that are statistically relevant for each application (e.g. correlated with the outcome).

Additional benefits of the techniques provided herein include improved analysis uniformity. Several histopathology applications require scoring biomarker images stained using Immunofluorescence (IF) techniques. Scoring is usually performed manually by a human expert. Very often, manual scoring is subjective and can be affected by the viewing software and/or device. This may result with intra and/or inter-observer variability.

In contrast, the modular image analysis techniques for scoring biomarker images using a small set of features (metrics) may be applied across a number of biomarkers. FIG. 16 shows the results of a five-antibody assay of Pulmotype lung cancer. Five proteins were targeted by these antibodies: TRIM29, CEACAM5, SLC7A5, MUC1 and CK5/6. Two tissue microarray (TMA) slides from 74 patients included 24 SCC and 26 AD. A pathologist was asked to score the 5 biomarker images for each core twice. First, viewing parameters (window/level) were arbitrarily set for each image. Second, the parameters (window/level) were optimized at the slide level. As a result, the variability in manual biomarker scoring (optimized VS un-optimized) ranged from 5% to 15%.

All of the images were then processed using the modular image analysis pipeline. Two segmentation methods were used to distinguish different image regions: epithelium vs. stroma and nuclear vs. extra-nuclear. Four image ROIs were extracted: (1)epithelial/nuclei (2) epithelial/extra-nuclei (3) stromal/nuclei (4) stromal/extra-nuclei. In addition, each biomarker image was segmented using a multi-level thresholding approach. Thresholds were estimated using slide-level histograms. In this example, 2 positivity levels were used: weak and strong. Then, 28 intensity, percentage area, texture and co-localization features were computed for each biomarker using either the whole image, one or multiple regions of interest. The list of the features is given in FIG. 16. One TMA slide (24 patients) was used for training and the other one (50 patients) for testing. The scoring was formulated as a regression problem where five linear models were built to predict biomarker scores (one for each biomarker). This was performed using two steps. First, a small set of relevant features were automatically selected for each biomarker. Second, a linear model was built for each biomarker using the selected biomarker. For feature selection, two steps were performed. First, step-wise regression with forward selection was applied on the set of 28 features. In that method, the model starts with one feature and then features are added one at a time and kept if they improve the model performance. This is repeated until no feature can make further improvement. Second, highly significant features were selected from the resulting model by selecting features with p<0.05. As a result, 4-5 features were selected (on average) out of the 28 features. The colored boxes in FIG. 16 are the selected features/metrics. The trained regression models were first applied on the training slide of 24 patients and then classification cut-offs were estimated so that the classification error was minimized. Then, the models were tested on the second slide (50 patients) and the cut-offs were applied on the regression outcomes. Automated scores were compared to the manual scores for both training and testing slides. The confusion matrices are shown in FIG. 17. The overall sensitivity and specificity for the 5 biomarkers were 95% and 87%, respectively.

Binding of Probes and Targets to Generate a Signal

"Target," as used herein, generally refers to the component of a biological sample that may be detected when present in the biological sample. The target may be any substance for which there exists a naturally occurring specific binder (e.g., an antibody), or for which a specific binder may be prepared (e.g., a small molecule binder). In general, the binder portion of the probe may bind to target through one or more discrete chemical moieties of the target or a three-dimensional structural component of the target (e.g., 3D structures resulting from peptide folding). The target may include one or more of peptides, proteins (e.g., antibodies, affibodies, or aptamers), nucleic acids (e.g., polynucleotides, DNA, RNA, or aptamers); polysaccharides (e.g., lectins or sugars), lipids, enzymes, enzyme substrates, ligands, receptors, antigens, or haptens.

As used herein, the term "probe" may refer to an agent including a binder and a signal generator. In some embodiments, the binder and the signal generator of the probe are embodied in a single entity (e.g., a radioactive or fluorescent molecule capable of binding a target). In alternative embodiments, the binder and the signal generator are embodied in discrete entities (e.g., a primary antibody capable of binding target and labeled secondary antibody capable of binding the primary antibody).

When the binder and signal generator are separate entities they may be applied to a biological sample in a single step or separate steps. Thus, the binder and signal generator may be attached directly (e.g., via a radiolabeled atom incorporated into the binder) or indirectly (e.g., through a linker, which may include a cleavage site) and applied to the biological sample in a single step. For some embodiments in which the binder and the signal generator are separate entities, they may be pre-attached prior to application to the biological sample and applied to the biological sample in a single step. In other embodiments in which the binder and signal generator are separate entities, they may be applied to the biological sample independently and associate following application.

As used herein, the term "binder" may refer to a biological molecule that may non-covalently bind to one or more targets in the biological sample. A binder may specifically bind to a target. Suitable binders may include one or more of natural or modified peptides, proteins (e.g., antibodies, affibodies, or aptamers), nucleic acids (e.g., polynucleotides, DNA, RNA, or aptamers); polysaccharides (e.g., lectins, sugars), lipids, enzymes, enzyme substrates or inhibitors, ligands, receptors, antigens, haptens, and the like. A suitable binder may be selected depending on the sample to be analyzed and the targets available for detection. For example, a target in the sample may include a ligand and the binder may include a receptor or a target may include a receptor and the probe may include a ligand. Similarly, a target may include an antigen and the binder may include an antibody or antibody fragment or vice versa. In some embodiments, a target may include a nucleic acid and the binder may include a complementary nucleic acid. In some embodiments, both the target and the binder may include proteins capable of binding to each other.

As used herein, the term "signal generator" refers to a molecule capable of providing a detectable signal using one or more detection techniques (e.g., spectrometry, calorimetry, spectroscopy, or visual inspection). Suitable examples of a detectable signal may include an optical signal, and electrical signal, or a radioactive signal. Examples of signal generators useful in the inventive methods include, for example, a chromophore, a fluorophore, a Raman-active tag, a radioactive label, an enzyme, an enzyme substrate, or combinations thereof. As stated above, with regard to the probe, the signal generator and the binder may be present in a single entity (e.g., a target binding protein with a fluorescent label or radiolabel). And, in other embodiments the binder and the signal generator are discrete entities (e.g., target receptor protein and antibody against that particular receptor protein) that associate with each other prior to or upon introduction to the sample.

A target according to an embodiment of the invention may be present on the surface of a biological sample (for example, an antigen on a surface of a tissue section) or present in the bulk of the sample (for example, an antibody in a buffer solution). In some embodiments, a target may not be inherently present on the surface of a biological sample and the biological sample may have to be processed to make the target available on the surface. In some embodiments, the target may be soluble in a body fluid such as blood, blood plasma, serum, or urine. In some embodiments, the target may be in a tissue, either on a cell surface, or within a cell.

In one embodiment, the targets may be features or structures, such as nuclei, membranes, nucleic acids, blood vessels, epithelia markers, or stromal markers, compartment markers.

Suitability of target(s) to be analyzed may be determined by the type and nature of analysis required for the biological sample. In some embodiments, a target may provide information about the presence or absence of an analyte in the biological sample. In another embodiment, a target may provide information on a state of a biological sample. For example, if the biological sample includes a tissue sample, the methods disclosed herein may be used to detect target(s) that may help in comparing different types of cells or tissues, comparing different developmental stages, detecting the presence of a disease or abnormality, or determining the type of disease or abnormality.

Suitable targets may include one or more of peptides, proteins (e.g., antibodies, affibodies, or aptamers), nucleic acids (e.g., polynucleotides, DNA, RNA, or aptamers); polysaccharides (e.g., lectins or sugars), lipids, enzymes, enzyme substrates, ligands, receptors, antigens, or haptens. One or more of the aforementioned targets may be characteristic of particular cells, while other targets may be associated with a particular disease or condition. In some embodiments, targets in a tissue sample that may be detected and analyzed using the methods disclosed herein may include, but are not limited to, prognostic targets, hormone or hormone receptor targets, lymphoid targets, tumor targets, cell cycle associated targets, neural tissue and tumor targets, or cluster differentiation targets Suitable examples of prognostic targets may include enzymatic targets such as galactosyl transferase II, neuron specific enolase, proton ATPase-2, or acid phosphatase. Suitable examples of hormone or hormone receptor targets may include human chorionic gonadotropin (HCG), adrenocorticotropic hormone, carcinoembryonic antigen (CEA), prostate-specific antigen (PSA), estrogen receptor, progesterone receptor, androgen receptor, gClq-R/p33 complement receptor, IL-2 receptor, p75 neurotrophin receptor, PTH receptor, thyroid hormone receptor, or insulin receptor. Suitable examples of lymphoid targets may include alpha-1-antichymotrypsin, alpha-1-antitrypsin, B cell target, bcl-2, bcl-6, B lymphocyte antigen 36 kD, BM1 (myeloid target), BM2 (myeloid target), galectin-3, granzyme B, HLA class I Antigen, HLA class II (DP) antigen, HLA class II (DQ) antigen, HLA class II (DR) antigen, human neutrophil defensins, immunoglobulin A, immunoglobulin D, immunoglobulin G, immunoglobulin M, kappa light chain, kappa light chain, lambda light chain, lymphocyte/histocyte antigen, macrophage target, muramidase (lysozyme), p80 anaplastic lymphoma kinase, plasma cell target, secretory leukocyte protease inhibitor, T cell antigen receptor (JOVI 1), T cell antigen receptor (JOVI 3), terminal deoxynucleotidyl transferase, or unclustered B cell target.

Suitable examples of tumor targets may include alpha fetoprotein, apolipoprotein D, BAG-1 (RAP46 protein), CA19-9 (sialyl lewisa), CA50 (carcinoma associated mucin antigen), CA125 (ovarian cancer antigen), CA242 (tumor associated mucin antigen), chromogranin A, clusterin (apolipoprotein J), epithelial membrane antigen, epithelial-related antigen, epithelial specific antigen, gross cystic disease fluid protein-15, hepatocyte specific antigen, heregulin, human gastric mucin, human milk fat globule, MAGE-1, matrix metalloproteinases, melan A, melanoma target (HMB45), mesothelin, metallothionein, microphthalmia transcription factor (MITF), Muc-1 core glycoprotein. Muc-1 glycoprotein, Muc-2 glycoprotein, Muc-5AC glycoprotein, Muc-6 glycoprotein, myeloperoxidase, Myf-3 (Rhabdomyosarcoma target), Myf-4 (Rhabdomyosarcoma target), MyoD1 (Rhabdomyosarcoma target), myoglobin, nm23 protein, placental alkaline phosphatase, prealbumin, prostate specific antigen, prostatic acid phosphatase, prostatic inhibin peptide, PTEN, renal cell carcinoma target, small intestinal mucinous antigen, tetranectin, thyroid transcription factor-1, tissue inhibitor of matrix metalloproteinase 1, tissue inhibitor of matrix metalloproteinase 2, tyrosinase, tyrosinase-related protein-1, villin, or von Willebrand factor.

Suitable examples of cell cycle associated targets may include apoptosis protease activating factor-1, bcl-w, bcl-x, bromodeoxyuridine, CAK (cdk-activating kinase), cellular apoptosis susceptibility protein (CAS), caspase 2, caspase 8, CPP32 (caspase-3), CPP32 (caspase-3), cyclin dependent kinases, cyclin A, cyclin B1, cyclin D1, cyclin D2, cyclin D3, cyclin E, cyclin G, DNA fragmentation factor (N-terminus), Fas (CD95), Fas-associated death domain protein, Fas ligand, Fen-1, IPO-38, Mcl-1, minichromosome maintenance proteins, mismatch repair protein (MSH2), poly (ADP-Ribose) polymerase, proliferating cell nuclear antigen, p16 protein, p27 protein, p34cdc2, p57 protein (Kip2), p105 protein, Stat 1 alpha, topoisomerase I, topoisomerase II alpha, topoisomerase III alpha, or topoisomerase II beta.

Suitable examples of neural tissue and tumor targets may include alpha B crystallin, alpha-internexin, alpha synuclein, amyloid precursor protein, beta amyloid, calbindin, choline acetyltransferase, excitatory amino acid transporter 1, GAP43, glial fibrillary acidic protein, glutamate receptor 2, myelin basic protein, nerve growth factor receptor (gp75), neuroblastoma target, neurofilament 68 kD, neurofilament 160 kD, neurofilament 200 kD, neuron specific enolase, nicotinic acetylcholine receptor alpha4, nicotinic acetylcholine receptor beta2, peripherin, protein gene product 9, S-100 protein, serotonin, SNAP-25, synapsin I, synaptophysin, tau, tryptophan hydroxylase, tyrosine hydroxylase, or ubiquitin.

Suitable examples of cluster differentiation targets may include CD1a, CD1b, CD1c, CD1d, CD1e, CD2, CD3delta, CD3epsilon, CD3gamma, CD4, CD5, CD6, CD7, CD8alpha, CD8beta, CD9, CD10, CD11a, CD11b, CD11c, CDw12, CD13, CD14, CD15, CD15s, CD16a, CD16b, CDw17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42a, CD42b, CD42c, CD42d, CD43, CD44, CD44R, CD45, CD46, CD47, CD48, CD49a, CD49b, CD49c, CD49d, CD49e, CD49f, CD50, CD51, CD52, CD53, CD54, CD55, CD56, CD57, CD58, CD59, CDw60, CD61, CD62E, CD62L, CD62P, CD63, CD64, CD65, CD65s, CD66a, CD66b, CD66c, CD66d, CD66e, CD66f, CD68, CD69, CD70, CD71, CD72, CD73, CD74, CDw75, CDw76, CD77, CD79a, CD79b, CD80, CD81, CD82, CD83, CD84, CD85, CD86, CD87, CD88, CD89, CD90, CD91, CDw92, CDw93, CD94, CD95, CD96, CD97, CD98, CD99, CD100, CD101, CD102, CD103, CD104, CD105, CD106, CD107a, CD107b, CDw108, CD109, CD114, CD115, CD116, CD117, CDw119, CD120a, CD120b, CD121a, CDw121b, CD122, CD123, CD124, CDw125, CD126, CD127, CDw128a, CDw128b, CD130, CDw131, CD132, CD134, CD135, CDw136, CDw137, CD138, CD139, CD140a, CD140b, CD141, CD142, CD143, CD144, CDw145, CD146, CD147, CD148, CDw149, CDw150, CD151, CD152, CD153, CD154, CD155, CD156, CD157, CD158a, CD158b, CD161, CD162, CD163, CD164, CD165, CD166, and TCR-zeta.

Other suitable prognostic targets hormone or hormone receptor targets lymphoid targets tumor targets cell cycle associated targets neural tissue and tumor targets include centromere protein-F (CENP-F), giantin, involucrin, lamin A&C (XB 10), LAP-70, mucin, nuclear pore complex proteins, p180 lamellar body protein, ran, cathepsin D, Ps2 protein, Her2-neu, P53, 5100, epithelial target antigen (EMA), TdT, MB2, MB3, PCNA, or Ki67.

In some embodiments, the present methods may employ probes that do not include an intrinsic signal generator. In some alternative embodiments, the probe does include a binder capable of binding to the target and a signal generator capable of providing a detectable signal. Thus, In some embodiments, the binder and the signal generator are not be associated to each other and may be present as a mixture or as separate components that associate following sequential application of the binder and signal generator to the biological sample. In alternate embodiments, the binder and the signal generator may be associated to each other. As used herein, "associated" generally refers to two entities (for example, binder and signal generator) stably bound to one another by any physicochemical means. The nature of the association may be such that it does not substantially impair the effectiveness of either entity. A binder and a signal generator may be associated to each other through covalent or non-covalent interactions. Non-covalent interactions may include, but are not limited to, hydrophobic interactions, ionic interactions, hydrogen-bond interactions, high affinity interactions (such as, biotin-avidin or biotin-streptavidin complexation), or other affinity interactions.

In some embodiments, a binder and a signal generator may be associated to each other directly (that is without any linkers). In other embodiments, a binder and a signal generator may be conjugated to each other via a linker. A linker may include a form of linking structure or sequence formed due to the non-covalent or covalent bond formation. In some embodiments, the linker may be chemically stable, that is, may maintain its integrity in the presence of a chemical agent. In some embodiments, the linker may be susceptible to chemical agents that is may be capable of dissociating, cleaving, or hydrolyzing in the presence of a chemical agent. Suitable examples of linkers may include disulfide bonds (e.g., SPDP or SMPT), pH sensitive structures/sequences, structures/sequences that may be reduced in the presence of an reducing agent, structures/sequences that may be oxidized in the presence of an oxidizing agent, or any other chemical or physical bond that may be easily manipulated (dissociated, cleaved, or hydrolyzed) in the presence of a chemical agent.

In some embodiments, the binder may be intrinsically labeled with a signal generator (for example, if the binder is a protein, during synthesis using a detectably labeled amino acid). A binder that is intrinsically labeled may not require a separate signal generator in order to be detected. Rather the intrinsic label may be sufficient for rendering the probe detectable. In alternate embodiments, the binder may be labeled by binding to it a specific signal generator (i.e., extrinsically labeled).

A binder and a signal generator may be chemically linked to each other through functional groups capable of reacting and forming a linkage under suitable conditions. Suitable examples of functional group combinations may include, but are not limited to, amine ester and amines or anilines; acyl azide and amines or anilines; acyl halides and amines, anilines, alcohols, or phenols; acyl nitrile and alcohols or phenols; aldehyde and amines or anilines; alkyl halide and amines, anilines, alcohols, phenols or thiols; alkyl sulfonate and thiols, alcohols or phenols; anhydride and alcohols, phenols, amines or anilines; aryl halide and thiols; aziridine and thiols or thioethers; carboxylic acid and amines, anilines, alcohols or alkyl halides; diazoalkane and carboxylic acids; epoxide and thiols; haloacetamide and thiols; halotriazin and amines, anilines or phenols; hydrazine and aldehydes or ketones; hydroxyamine and aldehydes or ketones; imido ester and amines or anilines; isocyanate and amines or anilines; and isothiocyanate and amines or anilines. A functional group in one of the aforementioned functional group pair may be present in a binder and a corresponding functional group may be present in the signal generator. For example, a binder may include a carboxylic acid and the signal generator may include an amine, aniline, alcohol or acyl halide, or vice versa. Conjugation between the binder and the signal generator may be effected in this case by formation of an amide or an ester linkage.

The methods disclosed herein involve the use of binders that physically bind to the target in a specific manner. In some embodiments, a binder may bind to a target with sufficient specificity, that is, a binder may bind to a target with greater affinity than it does to any other molecule. In some embodiments, the binder may bind to other molecules, but the binding may be such that the non-specific binding may be at or near background levels. In some embodiments, the affinity of the binder for the target of interest may be in a range that is at least 2-fold, at least 5-fold, at least 10-fold, or more than its affinity for other molecules. In some embodiments, binders with the greatest differential affinity may be employed, although they may not be those with the greatest affinity for the target.

Binding between the target and the binder may be affected by physical binding. Physical binding may include binding effected using non-covalent interactions. Non-covalent interactions may include, but are not limited to, hydrophobic interactions, ionic interactions, hydrogen-bond interactions, or affinity interactions (such as, biotin-avidin or biotin-streptavidin complexation). In some embodiments, the target and the binder may have areas on their surfaces or in cavities giving rise to specific recognition between the two resulting in physical binding. In some embodiments, a binder may bind to a biological target based on the reciprocal fit of a portion of their molecular shapes.

Binders and their corresponding targets may be considered as binding pairs, of which non-limiting examples include immune-type binding-pairs, such as, antigen/antibody, antigen/antibody fragment, or hapten/anti-hapten; nonimmune-type binding-pairs, such as biotin/avidin, biotin/streptavidin, folic acid/folate binding protein, hormone/hormone receptor, lectin/specific carbohydrate, enzyme/enzyme, enzyme/substrate, enzyme/substrate analog, enzyme/pseudo-substrate (substrate analogs that cannot be catalyzed by the enzymatic activity), enzyme/co-factor, enzyme/modulator, enzyme/inhibitor, or vitamin B12/intrinsic factor. Other suitable examples of binding pairs may include complementary nucleic acid fragments (including DNA sequences, RNA sequences, PNA sequences, and peptide nucleic acid sequences); Protein A/antibody; Protein G/antibody; nucleic acid/nucleic acid binding protein; or polynucleotide/polynucleotide binding protein.

In some embodiments, the binder may be a sequence- or structure-specific binder, wherein the sequence or structure of a target recognized and bound by the binder may be sufficiently unique to that target.

In some embodiments, the binder may be structure-specific and may recognize a primary, secondary, or tertiary structure of a target. A primary structure of a target may include specification of its atomic composition and the chemical bonds connecting those atoms (including stereochemistry), for example, the type and nature of linear arrangement of amino acids in a protein. A secondary structure of a target may refer to the general three-dimensional form of segments of biomolecules, for example, for a protein a secondary structure may refer to the folding of the peptide "backbone" chain into various conformations that may result in distant amino acids being brought into proximity with each other. Suitable examples of secondary structures may include, but are not limited to, alpha helices, beta pleated sheets, or random coils. A tertiary structure of a target may be is its overall three dimensional structure. A quaternary structure of a target may be the structure formed by its noncovalent interaction with one or more other targets or macromolecules (such as protein interactions). An example of a quaternary structure may be the structure formed by the four-globin protein subunits to make hemoglobin. A binder in accordance with the embodiments of the invention may be specific for any of the afore-mentioned structures.

An example of a structure-specific binder may include a protein-specific molecule that may bind to a protein target. Examples of suitable protein-specific molecules may include antibodies and antibody fragments, nucleic acids (for example, aptamers that recognize protein targets), or protein substrates (non-catalyzable).

In some embodiments, a target may include an antigen and a binder may include an antibody. A suitable antibody may include monoclonal antibodies, polyclonal antibodies, multispecific antibodies (for example, bispecific antibodies), or antibody fragments so long as they bind specifically to a target antigen.

In some embodiments, a target may include a monoclonal antibody. A "monoclonal antibody" may refer to an antibody obtained from a population of substantially homogeneous antibodies, that is, the individual antibodies comprising the population are identical except for possible naturally occurring mutations that may be present in minor amounts. Monoclonal antibodies may be highly specific, being directed against a single antigenic site. Furthermore, in contrast to (polyclonal) antibody preparations that typically include different antibodies directed against different determinants (epitopes), each monoclonal antibody may be directed against a single determinant on the antigen. A monoclonal antibody may be prepared by any known method such as the hybridoma method, by recombinant DNA methods, or may be isolated from phage antibody libraries.

In some embodiments, a biological sample may include a cell or a tissue sample and the methods disclosed herein may be employed in immunohistochemistry (IHC) Immunochemistry may involve binding of a target antigen to an antibody-based binder to provide information about the tissues or cells (for example, diseased versus normal cells). Examples of antibodies (and the corresponding diseases/disease cells) suitable as binders for methods disclosed herein include, but are not limited to, anti-estrogen receptor antibody (breast cancer), anti-progesterone receptor antibody (breast cancer), anti-p53 antibody (multiple cancers), anti-Her-2/neu antibody (multiple cancers), anti-EGFR antibody (epidermal growth factor, multiple cancers), anti-cathepsin D antibody (breast and other cancers), anti-Bcl-2 antibody (apoptotic cells), anti-E-cadherin antibody, anti-CA125 antibody (ovarian and other cancers), anti-CA15-3 antibody (breast cancer), anti-CA19-9 antibody (colon cancer), anti-c-erbB-2 antibody, anti-P-glycoprotein antibody (MDR, multi-drug resistance), anti-CEA antibody (carcinoembryonic antigen), anti-retinoblastoma protein (Rb) antibody, anti-ras oneoprotein (p21) antibody, anti-Lewis X (also called CD15) antibody, anti-Ki-67 antibody (cellular proliferation), anti-PCNA (multiple cancers) antibody, anti-CD3 antibody (T-cells), anti-CD4 antibody (helper T cells), anti-CD5 antibody (T cells), anti-CD7 antibody (thymocytes, immature T cells, NK killer cells), anti-CD8 antibody (suppressor T cells), anti-CD9/p24 antibody (ALL), anti-CD10 (also called CALLA) antibody (common acute lymphoblasic leukemia), anti-CD11c antibody (Monocytes, granulocytes, AML), anti-CD13 antibody (myelomonocytic cells, AML), anti-CD14 antibody (mature monocytes, granulocytes), anti-CD15 antibody (Hodgkin's disease), anti-CD19 antibody (B cells), anti-CD20 antibody (B cells), anti-CD22 antibody (B cells), anti-CD23 antibody (activated B cells, CLL), anti-CD30 antibody (activated T and B cells, Hodgkin's disease), anti-CD31 antibody (angiogenesis marker), anti-CD33 antibody (myeloid cells, AML), anti-CD34 antibody (endothelial stem cells, stromal tumors), anti-CD35 antibody (dendritic cells), anti-CD38 antibody (plasma cells, activated T, B, and myeloid cells), anti-CD41 antibody (platelets, megakaryocytes), anti-LCA/CD45 antibody (leukocyte common antigen), anti-CD45RO antibody (helper, inducer T cells), anti-CD45RA antibody (B cells), anti-CD39, CD100 antibody, anti-CD95/Fas antibody (apoptosis), anti-CD99 antibody (Ewings Sarcoma marker, MIC2 gene product), anti-CD106 antibody (VCAM-1; activated endothelial cells), anti-ubiquitin antibody (Alzheimer's disease), anti-CD71 (transferrin receptor) antibody, anti-c-myc (oncoprotein and a hapten) antibody, anti-cytokeratins (transferrin receptor) antibody, anti-vimentins (endothelial cells) antibody (B and T cells), anti-HPV proteins (human papillomavirus) antibody, anti-kappa light chains antibody (B cell), anti-lambda light chains antibody (B cell), anti-melanosomes (HMB45) antibody (melanoma), anti-prostate specific antigen (PSA) antibody (prostate cancer), anti-S-100 antibody (melanoma, salvary, glial cells), anti-tau antigen antibody (amyloid associated disease), anti-fibrin antibody (epithelial cells), anti-keratins antibody, anti-cytokeratin antibody (tumor), anti-alpha-catenin (cell membrane), or anti-Tn-antigen antibody (colon carcinoma, adenocarcinomas, and pancreatic cancer).

Other specific examples of suitable antibodies may include, but are not limited to, but are not limited to, anti proliferating cell nuclear antigen, clone pc10 (Sigma Aldrich, P8825); anti smooth muscle alpha actin (SmA), clone 1A4 (Sigma, A2547); rabbit anti beta catenin (Sigma, C 2206); mouse anti pan cytokeratin, clone PCK-26 (Sigma, C1801); mouse anti estrogen receptor alpha, clone IDS (DAKO, M 7047); beta catenin antibody, clone 15B8 (Sigma, C 7738); goat anti vimentin (Sigma, V4630); cycle androgen receptor clone AR441 (DAKO, M3562); Von Willebrand Factor 7, keratin 5, keratin 8/18, e-cadherin, Her2/neu, Estrogen receptor, p53, progesterone receptor, beta catenin; donkey anti-mouse (Jackson Immunoresearch, 715-166-150); or donkey anti rabbit (Jackson Immunoresearch, 711-166-152).

In some embodiments, a binder may be sequence-specific. A sequence-specific binder may include a nucleic acid and the binder may be capable of recognizing a particular linear arrangement of nucleotides or derivatives thereof in the target. In some embodiments, the linear arrangement may include contiguous nucleotides or derivatives thereof that may each bind to a corresponding complementary nucleotide in the binder. In an alternate embodiment, the sequence may not be contiguous as there may be one, two, or more nucleotides that may not have corresponding complementary residues on the probe. Suitable examples of nucleic acid-based binders may include, but are not limited to, DNA or RNA oligonucleotides or polynucleotides. In some embodiments, suitable nucleic acids may include nucleic acid analogs, such as dioxygenin dCTP, biotin dcTP 7-aza-guanosine, azidothymidine, inosine, or uridine.

In certain embodiments, both the binder and the target may include nucleic acids. In some embodiments, a nucleic-acid based binder may form a Watson-Crick bond with the nucleic acid target. In another embodiment, the nucleic acid binder may form a Hoogsteen bond with the nucleic acid target, thereby forming a triplex. A nucleic acid binder that binds by Hoogsteen binding may enter the major groove of a nucleic acid target and hybridizes with the bases located there. Suitable examples of the above binders may include molecules that recognize and bind to the minor and major grooves of nucleic acids (for example, some forms of antibiotics.) In certain embodiments, the nucleic acid binders may form both Watson-Crick and Hoogsteen bonds with the nucleic acid target (for example, bis PNA probes are capable of both Watson-Crick and Hoogsteen binding to a nucleic acid).

The length of nucleic acid binder may also determine the specificity of binding. The energetic cost of a single mismatch between the binder and the nucleic acid target may be relatively higher for shorter sequences than for longer ones. In some embodiments, hybridization of smaller nucleic acid binders may be more specific than the hybridization of longer nucleic acid probes, as the longer probes may be more amenable to mismatches and may continue to bind to the nucleic acid depending on the conditions. In certain embodiments, shorter binders may exhibit lower binding stability at a given temperature and salt concentration. Binders that may exhibit greater stability to bind short sequences may be employed in this case (for examples, bis PNA). In some embodiments, the nucleic acid binder may have a length in range of from about 4 nucleotides to about 12 nucleotides, from about 12 nucleotides to about 25 nucleotides, from about 25 nucleotides to about 50 nucleotides, from about 50 nucleotides to about 100 nucleotides, from about 100 nucleotides to about 250 nucleotides, from about 250 nucleotides to about 500 nucleotides, or from about 500 nucleotides to about 1000 nucleotides. In some embodiments, the nucleic acid binder may have a length in a range that is greater than about 1000 nucleotides. Notwithstanding the length of the nucleic acid binder, all the nucleotide residues of the binder may not hybridize to complementary nucleotides in the nucleic acid target. For example, the binder may include 50 nucleotide residues in length, and only 25 of those nucleotide residues may hybridize to the nucleic acid target. In some embodiments, the nucleotide residues that may hybridize may be contiguous with each other. The nucleic acid binders may be single stranded or may include a secondary structure. In some embodiments, a biological sample may include a cell or a tissue sample and the biological sample may be subjected to in-situ hybridization (ISH) using a nucleic acid binder. In some embodiments, a tissue sample may be subjected to in-situ hybridization in addition to immunohistochemistry (IHC) to obtain desired information regarding the tissue sample.

Regardless of the type of binder and the target, the specificity of binding between the binder and the target may also be affected depending on the binding conditions (for example, hybridization conditions in case of complementary nucleic acids. Suitable binding conditions may be realized by modulation one or more of pH, temperature, or salt concentration.

As noted hereinabove, a binder may be intrinsically labeled (signal generator attached during synthesis of binder) with a signal generator or extrinsically labeled (signal generator attached during a later step). For example, for a protein-based binder, an intrinsically labeled binder may be prepared by employing labeled amino acids. Similarly, an intrinsically labeled nucleic acid may be synthesized using methods that incorporate signal generator-labeled nucleotides directly into the growing nucleic acid. In some embodiments, a binder may be synthesized in a manner such that signal generators may be incorporated at a later stage. For example, this latter labeling may be accomplished by chemical means by the introduction of active amino or thiol groups into nucleic acids of peptide chains. In some embodiments, a binder such a protein (for example, an antibody) or a nucleic acid (for example, a DNA) may be directly chemically labeled using appropriate chemistries for the same.

In some embodiments, combinations of binders may be used that may provide greater specificity or in certain embodiments amplification of the signal. Thus, in some embodiments, a sandwich of binders may be used, where the first binder may bind to the target and serve to provide for secondary binding, where the secondary binder may or may not include a signal generator, which may further provide for tertiary binding (if required) where the tertiary binding member may include a signal generator.

Suitable examples of binder combinations may include primary antibody-secondary antibody, complementary nucleic acids, or other ligand-receptor pairs (such as biotin-streptavidin). Some specific examples of suitable binder pairs may include mouse anti-myc for recombinant expressed proteins with c-myc epitope; mouse anti-HisG for recombinant protein with His-Tag epitope, mouse anti-xpress for recombinant protein with epitope-tag, rabbit anti-goat for goat IgG primary molecules, complementary nucleic acid sequence for a nucleic acid; mouse anti-thio for thioredoxin fusion proteins, rabbit anti-GFP for fusion protein, jacalin for $\alpha$-D-galactose; and melibiose for carbohydrate-binding proteins, sugars, nickel couple matrix or heparin.

In some embodiments, a combination of a primary antibody and a secondary antibody may be used as a binder. A primary antibody may be capable of binding to a specific region of the target and the secondary antibody may be capable of binding to the primary antibody. A secondary antibody may be attached to a signal generator before binding to the primary antibody or may be capable of binding to a signal generator at a later step. In an alternate embodiment, a primary antibody and specific binding ligand-receptor pairs (such as biotin-streptavidin) may be used. The primary antibody may be attached to one member of the pair (for example biotin) and the other member (for example streptavidin) may be labeled with a signal generator. The secondary antibody, avidin, streptavidin, or biotin may be each independently labeled with a signal generator.

In some embodiments, the methods disclosed herein may be employed in an immunohistochemical procedure, and a primary antibody may be used to specifically bind the target antigen in the tissue sample. A secondary antibody may be used to specifically bind to the primary antibody, thereby forming a bridge between the primary antibody and a subsequent reagent (for example a signal generator), if any. For example, a primary antibody may be mouse IgG (an antibody created in mouse) and the corresponding secondary antibody may be goat anti-mouse (antibody created in goat) having regions capable of binding to a region in mouse IgG.

In some embodiments, signal amplification may be obtained when several secondary antibodies may bind to epitopes on the primary antibody. In an immunohistochemical procedure a primary antibody may be the first antibody used in the procedure and the secondary antibody may be the second antibody used in the procedure. In some embodiments, a primary antibody may be the only antibody used in an IHC procedure.

The type of signal generator suitable for the methods disclosed herein may depend on a variety of factors, including the nature of the analysis being conducted, the type of the energy source and detector used, the type of chemical agent employed, the type of binder, the type of target, or the mode of attachment between the binder and the signal generator (e.g., cleavable or non-cleavable).

A suitable signal generator may include a molecule or a compound capable of providing a detectable signal. A signal generator may provide a characteristic signal following interaction with an energy source or a current. An energy source may include electromagnetic radiation source and a fluorescence excitation source. Electromagnetic radiation source may be capable of providing electromagnetic energy of any wavelength including visible, infrared, and ultraviolet. Electromagnetic radiation may be in the form of a direct light source or may be emitted by a light emissive compound such as a donor fluorophore. A fluorescence excitation source may be capable of making a source fluoresce or may give rise to photonic emissions (that is, electromagnetic radiation, directed electric field, temperature, physical contact, or mechanical disruption). Suitable signal generators may provide a signal capable of being detected by a variety of methods including optical measurements (for example, fluorescence), electrical conductivity, or radioactivity. Suitable signal generators may be, for example, light emitting, energy accepting, fluorescing, radioactive, or quenching.

A suitable signal generator may be sterically and chemically compatible with the constituents to which it is bound, for example, a binder. Additionally, a suitable signal generator may not interfere with the binding of the binder to the target, nor may it affect the binding specificity of the binder. A suitable signal generator may be organic or inorganic in nature. In some embodiments, a signal generator may be of a chemical, peptide or nucleic acid nature.

A signal generator may be directly or indirectly detectable. A directly detectable moiety may be one that may be detected directly by its ability to emit a signal, such as for example a fluorescent label that emits light of a particular wavelength following excitation by light of another lower, characteristic wavelength and/or absorb light of a particular wavelength. An indirectly detectable signal generator may be one that may be detected indirectly by its ability to bind, recruit, and, in some cases, cleave another moiety, which may in turn emit a signal. An example of an indirectly detectable signal generator may be an enzyme-based signal generator, which when contacted with a suitable substrate may cleave the substrate to provide a detectable signal. Alternatively, an indirectly detectable signal generator may be capable of binding a compound that does emit a signal. For example, a signal generator, such as, biotin which itself does not emit a signal when bound to labeled avidin or streptavidin molecules may be detected. Other examples of indirectly detectable signal generators may include ligands that bind specifically to particular receptors. Detectably labeled receptors may be allowed to bind to ligand labeled binders in order to detect the binders. For example, an antibody-based binder may be attached a small hapten and a signal generator may be attached to an anti-hapten antibody that may bind specifically to hapten.

A signal-generator, suitable in accordance with the methods disclosed herein may be amenable to manipulation on application of a chemical agent. In some embodiments, a signal generator may be capable of being chemically destroyed on exposure to a chemical agent. Chemical destruction may include complete disintegration of the signal generator or modification of the signal-generating component of the signal generator. Modification of the signal-generating component may include any chemical modification (such as addition, substitution, or removal) that may result in the modification of the signal generating properties. For example, unconjugating a conjugated signal generator may result in destruction of chromogenic properties of the signal generator. Similarly, substitution of a fluorescence-inhibiting functional group on a fluorescent signal generator may result in modification of its fluorescent properties.

In some embodiments, a signal generator may be associated with the binder via a cleavable linker. A cleavable linker may be susceptible to a chemical agent and may dissociate, hydrolyze, or cleave when contacted with the chemical agent. Cleavage of the cleavable linker may result in removal of the signal generator from the binder and subsequently the biological sample being analyzed. Suitability of a particular signal generator may be determined in part by the chemistry of the signal generator, for example, if a signal generator is amenable to destruction on application of a chemical agent then a cleavable linkage between the signal generator and the binder may not be required. Similarly, if the signal generator is not amenable to chemical destruction, a cleavable linker may be used to remove the signal generator from biological sample. Suitable examples of signal generators are described herein below.

In some embodiments, a signal generator may be selected from a light emissive molecule, a radioisotope (e.g., P32 or H3, 14C, 125I and 131I), an optical or electron density marker, a Raman-active tag an enzyme, an enzyme substrate (for example, a chromogenic substrate), an electron spin resonance molecule (such as for example nitroxyl radicals), an electrical charge transferring molecule (i.e., an electrical charge transducing molecule), a semiconductor nanocrystal, a semiconductor nanoparticle, a colloid gold nanocrystal, a microbead, a magnetic bead, a paramagnetic particle, a quantum dot, or an affinity molecule (e.g., a biotin molecule, a streptavidin molecule, a protein, a peptide, nucleic acid, a carbohydrate, an antigen, a hapten, an antibody, an antibody fragment, or a lipid).

In some embodiments, a signal generator may include a light-emissive molecule. A light emissive molecule may emit light in response to irradiation with light of a particular wavelength. Light emissive molecules may be capable of absorbing and emitting light through luminescence (non-thermal emission of electromagnetic radiation by a material upon excitation), phosphorescence (delayed luminescence as a result of the absorption of radiation), chemiluminescence (luminescence due to a chemical reaction), fluorescence, or polarized fluorescence.

In some embodiments, a signal-generator may be directly detectable. In some embodiments, a signal generator may include a chromophore. In some embodiments, a signal-generator may include a fluorescent molecule or a fluorophore. Suitable chromophores and fluorophores may include one or more molecules listed hereinabove. In some embodiments, the signal generator may be part of a FRET pair. FRET pair includes two fluorophores that are capable of undergoing FRET to produce or eliminate a detectable signal when positioned in proximity to one another. Some examples of donors may include Alexa 488, Alexa 546, BODIPY 493, Oyster 556, Fluor (FAM), Cy3, or TTR (Tamra). Some examples of acceptors may include Cy5, Alexa 594, Alexa 647, or Oyster 656.

In some embodiments, a signal generator may essentially include a fluorophore. In some embodiments, a signal generator may essentially include a fluorophore that may be attached to an antibody, for example, in an immunohistochemistry analysis. Suitable fluorophores that may be conjugated to a primary antibody include, but are not limited to, Fluorescein, Rhodamine, Texas Red, Cy2, Cy3, Cy5, VECTOR Red, ELF™ (Enzyme-Labeled Fluorescence), Cy2, Cy3, Cy3.5, Cy5, Cy7, Fluor X, Calcein, Calcein-AM, CRYPTOFLUOR™'S, Orange (42 kDa), Tangerine (35 kDa), Gold (31 kDa), Red (42 kDa), Crimson (40 kDa), BHMP, BHDMAP, Br-Oregon, Lucifer Yellow, Alexa dye family, N-[6-(7-nitrobenz-2-oxa-1,3-diazol-4-yl)amino] caproyl] (NBD), BODIPY., boron dipyrromethene difluoride, Oregon Green, MITOTRACKER, Red, DiOC.sub.7 (3), DiIC.sub.18, Phycoerythrin, Phycobiliproteins BPE (240 kDa) RPE (240 kDa) CPC (264 kDa) APC (104 kDa), Spectrum Blue, Spectrum Aqua, Spectrum Green, Spectrum Gold, Spectrum Orange, Spectrum Red, NADH, NADPH, FAD, Infra-Red (IR) Dyes, Cyclic GDP-Ribose (cGDPR), Calcofluor White, Lissamine, Umbelliferone, Tyrosine or Tryptophan. In some embodiments, a signal generator may essentially include a cyanine dye. In some embodiments, a signal generator may essentially include one or more cyanine dye (e.g., Cy3 dye, a Cy5 dye, or a Cy7 dye).

In some embodiments, a signal generator may be indirectly detectable, for example, an enzyme/enzyme substrate combination. In some embodiments, an enzyme may precipitate a soluble substrate to form an insoluble product (for example, in immunohistochemistry). Further, an enzyme may catalyze a chemical reaction of a chromogenic substrate that may be measured using a suitable technique. For example, the enzyme may catalyze a color change in a substrate, which can be measured spectrophotometrically. Alternatively, an enzyme may alter the fluorescence or chemiluminescence properties of the substrate. In some embodiments, where enzyme/enzyme substrates may be employed as signal generators, the enzyme-catalyzed reaction product of the substrate may be susceptible to the chemical agent resulting in modification of the product (for example, color destruction using hydrogen peroxide). Suitable examples of enzyme-substrate combinations are described herein below.

Horseradish peroxidase (HRPO) with hydrogen peroxidase as a substrate, wherein the hydrogen peroxidase may oxidize a dye precursor (e.g., orthophenylene diamine (OPD) or 3,3',5,5'-tetramethyl benzidine hydrochloride (TMB)). Other suitable HRPO substrates may include, but are not limited to, but are not limited to, 2,2' Azino-di-3-ethylbenz-thiazoline sulfonate (ABTS, green, water soluble), aminoethyl carbazole, 3-amino, 9-ethylcarbazole AEC (3A9EC, red), Alpha-naphthol pyronin (red), 4-chloro-1-naphthol (4C1N, blue, blue-black), 3,3'-diaminobenzidine tetrahydrochloride (DAB, brown), ortho-dianisidine (green), o-phenylene diamine (OPD, brown, water soluble), TACS Blue (blue), TACS Red (red), 3, 3',5,5'Tetramethylbenzidine (TMB, green or green/blue), TRUE BLUE (blue), VECTOR VIP (purple), VECTORSG (smoky blue-gray), and Zymed Blue HRP substrate (vivid blue). Alkaline phosphatase (AP) with para-Nitrophenyl phosphate may be used as a chromogenic substrate. Other suitable AP substrates include, but are not limited to, AP-Blue substrate (blue precipitate, Zymed catalog p. 61); AP-Orange substrate (orange, precipitate, Zymed), AP-Red substrate (red, red precipitate, Zymed), 5-bromo, 4-chloro, 3-indolyphosphate (BCIP substrate, turquoise precipitate), 5-bromo, 4-chloro, 3-indolyl phosphate/nitroblue tetrazolium/iodonitrotetrazolium (BCIP/INT substrate, yellow-brown precipitate, Biomeda), 5-bromo, 4-chloro, 3-indolyphosphate/nitroblue tetrazolium (BCIP/NBT substrate, blue/purple), 5-bromo, 4-chloro, 3-indolyl phosphate/nitroblue tetrazolium/iodonitrotetrazolium (BCIP/NBT/INT, brown precipitate, DAKO, Fast Red (Red), Magenta-phos (magenta), Naphthol AS-BI-phosphate (NABP)/Fast Red TR (Red), Naphthol AS-BI-phosphate (NABP)/New Fuchsin (Red), Naphthol AS-MX-phosphate (NAMP)/New Fuchsin (Red), New Fuchsin AP substrate (red), p-Nitrophenyl phosphate (PNPP, Yellow, water soluble), VECTOR Black (black), VECTOR, Blue (blue), VECTOR. Red (red), Vega Red (raspberry red color), D-galactosidase (β-D-Gal) with a chromogenic substrate (e.g., p-nitrophenyl-β-D-galactosidase) or fluorogenic substrate (e.g., 4-methylumbelliferyl-β-D-galactosidase). Other suitable β-galactosidase substrates, include, but are not limited to, 5-bromo-4-chloro-3-indoyl beta-D-galactopyranoside (X-gal, blue precipitate).

Suitable glucose oxidase (GO) substrates, include, but are not limited to, nitroblue tetrazolium (NBT, purple precipitate), tetranitroblue tetrazolium (TNBT, black precipitate), 2-(4-iodophenyl)-5-(4-nitorphenyl)-3-phenyltetrazolium chloride (INT, red or orange precipitate), Tetrazolium blue (blue), Nitrotetrazolium violet (violet), and 3-(4,5-dimethylthiazol-2-yl)-2,5-diphenyltetrazolium bromide (MTT, purple). Tetrazolium substrates may require glucose as a co-substrate. The precipitates associated with each of the substrates listed hereinabove may have unique detectable spectral signatures.

As described hereinabove, one or more of the aforementioned molecules may be used as a signal generator. In some embodiments, one or more of the aforementioned signal generators may not be amenable to chemical destruction and a cleavable linker may be employed to associate the signal generator and the binder. In some embodiments, one or more of the aforementioned signal generators may be amenable to signal destruction and the signal generator may essentially include a molecule capable of being destroyed chemically. In some embodiments, a signal generator may essentially include a fluorophore capable of being destroyed chemically. In some embodiments, a signal generator may essentially include a cyanine dye capable of being destroyed chemically. In some embodiments, a signal generator may essentially include one or more a Cy3 dye, a Cy5 dye, or a Cy7 dye capable of being destroyed or quenched chemically.

A chemical agent may include one or chemicals capable of modifying the signal generator or the cleavable linker (if present) between the signal generator and the binder. A chemical agent may be contacted with the signal generator in the form of a solid, a solution, a gel, or a suspension. Suitable chemical agents useful to modify the signal include agents that modify pH (for example, acids or bases), electron donors (e.g., nucleophiles), electron acceptors (e.g., electrophiles), oxidizing agents, reducing agents, or combinations thereof.

In some embodiments, a chemical agent may include a base, for example, sodium hydroxide, ammonium hydroxide, potassium carbonate, or sodium acetate. In some embodiments, a chemical agent may include an acid, for example, hydrochloric acid, sulfuric acid, acetic acid, formic acid, trifluoroacetic acid, or dichloroacetic acid. In some embodiments, a chemical agent may include nucleophiles, for example, cyanides, phosphines, or thiols. In some embodiments, a chemical gent may include reducing agents, for example, phosphines, thiols, sodium dithionite, or hydrides that can be used in the presence of water such as borohydride or cyanoborohydrides. In some embodiments, a chemical agent may include oxidizing agents, for example, active oxygen species, hydroxyl radicals, singlet oxygen, hydrogen peroxide, or ozone. In some embodiments, a chemical agent may include a fluoride, for example tetrabutylammonium fluoride, pyridine-HF, or $SiF_4$.

One or more of the aforementioned chemical agents may be used in the methods disclosed herein depending upon the susceptibility of the signal generator, of the binder, of the target, or of the biological sample to the chemical agent. In some embodiments, a chemical agent that essentially does not affect the integrity of the binder, the target, and the biological sample may be employed. In some embodiments, a chemical agent that does not affect the specificity of binding between the binder and the target may be employed.

In some embodiments, where two or more (up to four) signal generators may be employed simultaneously, a chemical agent may be capable of selectively modifying one or more signal generators. Susceptibility of different signal generators to a chemical agent may depend, in part, to the concentration of the signal generator, temperature, or pH.

For example, two different fluorophores may have different susceptibility to a base depending upon the concentration of the base.

Contacting and Binding the Probe or Probes with the Biological Sample

As provided herein, the biological samples may be contacted with one or more probes. For example, in one embodiment, the biological sample may be contacted with 1, 2, 3, 4, 5, 6, 7, 8, 9, 10 or more probes. In another embodiment, the biological sample may be contacted with 5-10 probes, 10-20 probes, 20-60 probes, or 20-100 probes. Further, the probes may include a combination of biomarker probes specific for targets of interest (e.g., proteins associated with a particular clinical condition, diagnosis, or other characteristic) and cellular feature probes that may be used for segmentation analysis. Such probes may include probes specific for nuclear targets, membrane targets, epithelial targets, cytoplasmic targets, etc. Cellular feature probes may include probes for DAPI (nuclear), pan-cadherin (cell membrane), smooth muscle actin (muscle), hematoxylin (DNA), eosin (cytoplasm), or keratin(epthielial).

A biological sample may be contacted with a probe to physically bind the probe to a target in the biological sample. In some embodiments, a target may not be easily accessible for binding the probe and a biological sample may be further processed to facilitate the binding between the target and the binder (in the probe). In some embodiments, a probe may be contacted with the biological sample in the form of a solution. Depending on the nature of the binder, the target, and the binding between the two, sufficient contact time may be allowed. In some embodiments, an excess of binder molecules may be employed to ensure all the targets in the biological sample are bound. After a sufficient time has been providing for the binding action, the sample may be contacted with a wash solution (for example an appropriate buffer solution) to wash away any unbound probes. Depending on the concentration and type of probes used, a biological sample may be subjected to a number of washing steps with the same or different washing solutions being employed in each step.

In some embodiments, the biological sample may be contacted with more than one probe in the first contacting step. The plurality of probes may be capable of binding different targets in the biological sample. For example, a biological sample may include two targets: target1 and target2 and two sets of probes may be used in this instance: probe1 (having binder1 capable of binding to target1) and probe2 (having binder2 capable of binding to target2). The plurality of probes may be contacted with the biological sample simultaneously (for example, as a single mixture) or sequentially (for example, a probe1 may be contacted with the biological sample, followed by washing step to remove any unbound probe1, followed by contacting a probe2 with the biological sample, and so forth), or a combination of simultaneous and sequential contact.

The number of probes that may be simultaneously bound to the target may depend on the type of detection employed, that is, the spectral resolution achievable. For example, for fluorescence-based signal generators, at most four different probes (providing four spectrally resolvable fluorescent signals) may be employed in accordance with the methods disclosed herein. Spectrally resolvable, in reference to a plurality of fluorescent signal generators, implies that the fluorescent emission bands of the signal generators are sufficiently distinct, that is, sufficiently non-overlapping, such that binders to which the respective signal generators are attached may be distinguished on the basis of the fluorescent signal generated by the respective signal generators using standard photodetection systems. In some embodiments, a biological sample may be essentially contacted with four or less than four probes in the first contacting step.

In some embodiments, a biological sample may include a whole cell, a tissue sample or a microarray. In some embodiments, a biological sample may include a tissue sample. The tissue sample may be obtained by a variety of procedures including, but not limited to surgical excision, aspiration or biopsy. The tissue may be fresh or frozen. In some embodiments, the tissue sample may be fixed and embedded in paraffin. The tissue sample may be fixed or otherwise preserved by conventional methodology; the choice of a fixative may be determined by the purpose for which the tissue is to be histologically stained or otherwise analyzed. The length of fixation may depend upon the size of the tissue sample and the fixative used. For example, neutral buffered formalin, Bouin's or paraformaldehyde, may be used to fix or preserve a tissue sample.

In some embodiments, the tissue sample may be first fixed and then dehydrated through an ascending series of alcohols, infiltrated and embedded with paraffin or other sectioning media so that the tissue sample may be sectioned. In an alternative embodiment, a tissue sample may be sectioned and subsequently fixed. In some embodiments, the tissue sample may be embedded and processed in paraffin. Examples of paraffin that may be used include, but are not limited to, Paraplast, Broloid, and Tissuecan. Once the tissue sample is embedded, the sample may be sectioned by a microtome into sections that may have a thickness in a range of from about three microns to about five microns. Once sectioned, the sections may be attached to slides using adhesives. Examples of slide adhesives may include, but are not limited to, silane, gelatin, poly-L-lysine. In embodiments, if paraffin is used as the embedding material, the tissue sections may be deparaffinized and rehydrated in water. The tissue sections may be deparaffinized, for example, by using organic agents (such as, xylenes or gradually descending series of alcohols).

In some embodiments, aside from the sample preparation procedures discussed above, the tissue section may be subjected to further treatment prior to, during, or following immunohistochemistry. For example, in some embodiments, the tissue section may be subjected to epitope retrieval methods, such as, heating of the tissue sample in citrate buffer. In some embodiments, a tissue section may be optionally subjected to a blocking step to minimize any non-specific binding.

Following the preparation of the tissue sample, a probe solution (e.g., labeled-antibody solution in an IHC procedure) may be contacted with the tissue section for a sufficient period of time and under conditions suitable for binding of binder to the target (e.g., antigen in an IHC procedure). As described earlier, two detection methods may be used: direct or indirect. In a direct detection, a signal generator-labeled primary antibody (e.g., fluorophore-labeled primary antibody) may be incubated with an antigen in the tissue sample, which may be visualized without further antibody interaction. In an indirect detection, an unconjugated primary antibody may be incubated with an antigen and then a labeled secondary antibody may bind to the primary antibody. Signal amplification may occur as several secondary antibodies may react with different epitopes on the primary antibody. In embodiments where the secondary antibody may be conjugated to an enzymatic label, a chromogenic or fluorogenic substrate may be added to provide visualization of the antigen. In some embodiments two or more (at most four) primary antibodies (labeled or unlabeled) may be contacted with the tissue sample. Unlabeled antibodies may be then contacted with the corresponding labeled secondary antibodies.

Technical effects of the disclosure include providing improved image analysis, independent of tissue architecture. The modular image analysis techniques allow operator-driven selections of segmentation/mask and biomarker metric outputs. Further, the disclosed techniques may be used to provide quantitation metrics for biomarkers independent of cell-level segmentation algorithms. Accordingly, the present techniques relate to a generic, modular, scalable and computationally reduced technique for image analysis. The techniques facilitate determination of the metrics of any biomarker(s) at a region-level where the region can be as small as a single or a few cells (identified by a specific biomarker) up to the whole image. In certain embodiments, multiple regions are extracted from each image. The ability to work at a region level permits image analysis even at relatively low magnifications (e.g. 10×). In addition, working at a region level permits computing metrics/features that capture patterns of intensity change (texture features) and structural properties of the tissue (morphological features), which can greatly enrich the set of metrics. Given the large number of metrics/features that can be computed, the image analysis approach may be used in a variety of applications such as image scoring, classification and survival analysis. In addition, the techniques may be used to perform some quality control steps such as antibody validation.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for image analysis of a biological sample comprising:
   a memory or storage device storing processor-executable instructions that, when executed by a processor, cause acts to be performed comprising:
   extracting a plurality of regions of interest of the biological sample, wherein each respective region of interest is based on at least one image data set of a plurality of image data sets, and wherein the plurality of image data sets are generated based at least in part on image data representative of one or more probes bound to one or more respective targets in the biological sample; and
   determining at least one metric for the respective regions of interest, wherein the at least one metric is based on a property of at least one probe of the one or more probes, wherein determining the at least one metric comprises performing a quantification function in a first region of interest based on a texture feature or a probe intensity of a first probe within the first region of interest; and
   a processor configured to execute the instructions stored in the memory or storage device,
   wherein the system is configured to provide modularly selectable workflows for the biological sample, based at least in part on a type of the biological sample, from a set of predetermined workflows for many biological sample types.

2. The system of claim 1, wherein the first region of interest of the plurality of regions of interest is based on a first image data set and a second image data set, wherein the first image data set is generated based at least in part on image data representative of the first probe and wherein the second image data set is generated based at least in part on image data representative of a second probe comprising a cellular feature probe.

3. The system of claim 2, wherein the first region of interest is an intersection, union, and/or difference of the first image data set and the second image data set.

4. The system of claim 2, wherein a second region of interest is based at least in part on only a portion of a second image data set and a third image data set, and wherein the second image data set is generated based at least in part on image data representative of the cellular feature probe and the third image data set is generated based at least in part on image data representative of a third probe.

5. The system of claim 4, wherein the first probe and the third probe are probes to different biomarkers.

6. The system of claim 2 wherein determining a second metric comprises performing a quantification function in a second region of interest based on a texture feature or a probe intensity of the first probe within the second region of interest.

7. The system of claim 1, wherein the at least one probe comprises a probe specific for a biomarker and one or more probes for an epithelium, a cytoplasm, a membrane, or a cell nucleus.

8. The system of claim 1, wherein the image data comprises aligned images of a single area of the biological sample.

9. A system for image analysis of a biological sample comprising:
   a memory or storage device storing processor-executable instructions that, when executed by a processor, cause acts to be performed comprising:
   receiving image data of a biological sample representative of a respective plurality of probes bound to a respective plurality of targets in the biological sample, wherein the plurality of probes comprises a first probe specific for a biomarker and a second probe specific for a cellular feature;
   generating a plurality of image data sets comprising a first image data set based on image data representative of the first probe and a second image data set based on image data representative of the second probe;
   extracting a region of interest of the biological sample based on at least the first image data set and the second image data set, and wherein the region of interest is based at least in part on only a portion of the first image data set and only a portion of the second image data set; and
   determining a metric of the biomarker in the extracted region of interest based on a property of the first probe in the region of interest, wherein determining the metric of the biomarker comprises performing a quantification function in the region of interest based on a morphological feature within the region of interest; and
   a processor configured to execute the instructions stored in the memory or storage device,
   wherein the system is configured to provide modularly selectable workflows for the biological sample, based at least in part on a type of the biological sample, from a set of predetermined workflows for many biological sample types.

10. The system of claim 9, wherein determining the metric of the biomarker comprises performing a quantification function in the region of interest based on an intensity of the first probe within the region of interest.

11. The system of claim 10, wherein the quantification function is based on one or more of a mean intensity, a median intensity, a standard deviation of intensity, a total intensity, or a threshold percentile intensity of the first probe within the region of interest.

12. The system of claim 9, wherein determining the metric of the biomarker comprises performing a quantification function in the region of interest based on a percentage area of expression of the first probe within the region of interest.

13. The system of claim 12, wherein the percentage area of expression is divided based on respective thresholds into regions of strong, medium, and weak expression level.

14. The system of claim 9, wherein determining the metric of the biomarker comprises performing a quantification function in the region of interest based on a texture feature within the region of interest.

15. The system of claim 14, wherein the quantification function in the region of interest based on the texture feature within the region of interest is based on one or more of an adaptive range or standard deviation, randomness, uniformity, non-uniformity, correlation, symmetry, linear dependency, or grey level short runs or long runs.

16. The system of claim 9, wherein determining the metric of the biomarker comprises performing a quantification function in the region of interest based on co-localization of the biomarker with a different biomarker.

17. The system of claim 9, wherein the first image data set comprises a biomarker positive mask and a biomarker negative mask.

18. The system of claim 1, wherein the first image data set comprises a plurality of positivity levels from multi-level thresholding.

19. The system of claim 9, wherein the second probe is a DAPI probe and the second image data set comprises a nuclear mask and an extranuclear mask.

20. The system of claim 19, wherein the region of interest is the intersection of the nuclear mask and the biomarker.

21. The system of claim 9, wherein the second probe is an epithelial probe and the second image data set comprises an epithelial mask and a stromal mask.

22. The system of claim 21, wherein the second image data set is generated using a segmentation algorithm.

23. The system of claim 21, wherein the plurality of probes comprises a third probe specific for the nucleus, a fourth probe specific for the membrane, and a fifth probe specific for the cytoplasm.

24. The system of claim 9, wherein the plurality of probes comprises at least seven probes, and wherein the image data is acquired by imaging the biological sample during sequential application of the at least seven probes to the biological sample.

25. A system for image analysis of a biological sample comprising:
a memory or storage device storing processor-executable instructions that, when executed by a processor, cause acts to be performed comprising:
receiving image data of the biological sample representative of a respective plurality of probes bound to a respective plurality of targets in the biological sample, wherein the plurality of probes comprises a first probe specific for a biomarker and a second probe specific for a cellular feature;
receiving an input comprising information related to a selection of only a subset of operations to be performed on the image data from a larger set of independent operations stored in the memory, wherein each of the operations in the larger set is configured to generate an image data set from the image data comprising at least two groups, wherein the subset of operations comprises a segmentation algorithm;
extracting a region of interest from the image data by performing the subset of operations to generate a plurality of respective image data sets associated with respective operations, wherein the region of interest is defined by only a subset of each respective image data set in the plurality of image data sets and wherein the region of interest is extracted from a first subset of a first image data set comprising data representative of the first probe and a second subset of a second image data set comprising data representative of the second probe; and
determining a metric of the biomarker in the extracted region of interest and a quantification function based on a property of the first probe; and
a processor configured to execute the instructions stored in the memory or storage device,
wherein the system is configured to provide modularly selectable workflows for the biological sample, based at least in part on a type of the biological sample, from a set of predetermined workflows for many biological sample types.

26. The system of claim 25, wherein the segmentation algorithm is configured to generate a data set comprising an epithelial group and a nonepithelial group.

27. The system of claim 25, wherein the subset of operations does not comprise a cellular segmentation algorithm.

28. The system of claim 25, wherein the first image data set comprises a biomarker positive group and a biomarker negative group.

29. The system of claim 25, wherein the region of interest is an intersection between only selected groups of the plurality of data sets and wherein the nonselected groups in the data sets are not in the region of interest.

30. A method for image analysis of a biological sample comprising:
providing modularly selectable workflows for the biological sample, based at least in part on a type of the biological sample, from a set of predetermined workflows for many biological sample types;
receiving image data of the biological sample representative of a respective plurality of probes bound to a respective plurality of targets in the biological sample;
receiving a first input comprising information related to a selection of only a first subset of independent operations to be performed on the image data from a larger set of operations stored in the memory, wherein each of the operations in the larger set is configured to generate an image data set from the image data comprising at least two groups, wherein the first subset of operations comprises a segmentation algorithm;
extracting a first region of interest from the image data by performing the first subset of independent operations to generate a first plurality of respective image data sets associated with the respective operations, wherein the first region of interest is based on only a subset of each respective image data set in the first plurality of data sets; and determining a first metric of at least one of the targets in the extracted first region of interest and a quantification function based on a property of at least one probe.

31. The method of claim 30, comprising:

receiving a second input comprising information related to a selection of only a second subset of operations to be performed on the image data from the larger set of independent operations stored in the memory, wherein the first subset is different than the second subset;

extracting a second region of interest from the image data by performing the second subset of operations to generate a second plurality of respective image data sets associated with respective operations, wherein the second region of interest is based on only a subset of each respective image data set in the second plurality of data sets; and determining a second metric of at least one of the targets in the extracted second region of interest and a quantification function based on a property of the at least one probe.

32. A system for image analysis of a biological sample comprising:

a memory or storage device storing processor-executable instructions that, when executed by a processor, cause acts to be performed comprising:

extracting a first region of interest of the biological sample based on only a portion of a first image data set, wherein the first image data set is generated based on image data representative of a first probe bound to a first target in the biological sample;

determining a first metric based at least in part on a property of the first probe in the region of interest, wherein determining the first metric comprises performing a quantification function in the first region of interest based on a texture feature or a probe intensity of the first probe within the first region of interest;

extracting a second region of interest of the biological sample that is different from the first region of interest; and determining a second metric in the second region of interest; and a processor configured to execute the instructions stored in the memory or storage device, wherein the system is configured to provide modularly selectable workflows for the biological sample, based at least in part on a type of the biological sample, from a set of predetermined workflows for many biological sample types.

33. The system of claim 32, wherein the first region of interest is based at least in part on only a portion of a second image data set and wherein the second image data set is generated based at least in part on image data representative of a second probe comprising a cellular feature probe.

34. The system of claim 33, wherein the first region of interest is an intersection of the portion of the first image data set and the portion of the second image data set.

35. The system of claim 33, wherein the second region of interest is based at least in part on only a portion of a second image data set and a third data set, and wherein the second image data set is generated based at least in part on image data representative of the cellular feature probe and the third image data set is generate based at least in part on image data representative of a third probe.

36. The system of claim 35, wherein first probe and the third probe are probes to different biomarkers.

37. The system of claim 32, wherein determining the second metric comprises performing a quantification function in the second region of interest based on a texture feature or a probe intensity of the first probe within the second region of interest.

38. The system of claim 32, wherein the cellular feature probe is a probe for a cellular protein.

39. The system of claim 32, wherein the cellular feature probe is a probe for an epithelium, a cytoplasm, a membrane, or a cell nucleus.

40. An image analysis method, comprising:

providing modularly selectable workflows for the biological sample, based at least in part on a type of the biological sample, from a set of predetermined workflows for many biological sample types;

generating a first image data set based on image data representative of a biomarker probe and a second image data set based on image data representative of a cellular feature probe, wherein the second image data set is generated by segmenting the image data representative of the cellular feature probe;

extracting a region of interest of the biological sample based on at least the first image data set and the second image data set, and wherein the region of interest is based at least in part on only a portion of the first image data set and only a portion of the second image data set; and determining a metric of the biomarker in the extracted region of interest based on a property of the first probe in the region of interest, wherein determining the metric comprises performing a quantification function in the extracted region of interest based on a texture feature or a probe intensity of the first probe within the extracted region of interest.

* * * * *